(12) United States Patent
Tokhtuev

(10) Patent No.: US 10,935,407 B2
(45) Date of Patent: Mar. 2, 2021

(54) FLUID FLOW METER WITH VISCOSITY CORRECTION

(71) Applicant: Ecolab USA Inc., St. Paul, MN (US)

(72) Inventor: Eugene Tokhtuev, Duluth, MN (US)

(73) Assignee: Ecolab USA Inc., Saint Paul, MN (US)

(*) Notice: Subject to any disclaimer, the term of this patent is extended or adjusted under 35 U.S.C. 154(b) by 302 days.

(21) Appl. No.: 16/043,506

(22) Filed: Jul. 24, 2018

(65) Prior Publication Data
US 2019/0033115 A1    Jan. 31, 2019

Related U.S. Application Data

(60) Provisional application No. 62/536,503, filed on Jul. 25, 2017.

(51) Int. Cl.
*G01F 15/02*   (2006.01)
*G01F 15/075*  (2006.01)
*G01F 25/00*   (2006.01)
*G01F 3/10*    (2006.01)

(52) U.S. Cl.
CPC .......... *G01F 15/024* (2013.01); *G01F 3/10* (2013.01); *G01F 15/0755* (2013.01); *G01F 25/0007* (2013.01); *G01F 15/022* (2013.01)

(58) Field of Classification Search
CPC ........ G01F 3/10; G01F 15/022; G01F 15/024; G01F 15/0755; G01F 25/0007
See application file for complete search history.

(56) References Cited

U.S. PATENT DOCUMENTS

| | | | |
|---|---|---|---|
| 1,945,822 A * | 2/1934 | Nivling | G01N 11/08 73/54.09 |
| 2,771,770 A * | 11/1956 | Bouman | G01N 11/08 73/54.09 |
| 3,143,880 A * | 8/1964 | Goldstein | G01F 1/48 73/861.42 |
| 3,779,457 A | 12/1973 | Lynas et al. | |
| 3,910,112 A * | 10/1975 | Gerlach | G01F 1/26 73/861.53 |
| 4,240,294 A | 12/1980 | Grande | |
| 4,328,549 A | 5/1982 | Avery | |
| 4,581,946 A | 4/1986 | Kanayama | |

(Continued)

FOREIGN PATENT DOCUMENTS

CA    2859228 A1    2/2016
CN    202188872 U   4/2012
(Continued)

OTHER PUBLICATIONS

JPH03269325A Machine Translation (Year: 2020).*
(Continued)

*Primary Examiner* — David L Singer
(74) *Attorney, Agent, or Firm* — Fredrikson & Byron, P.A.

(57) ABSTRACT

A fluid flow meter is provided that generates a pulsed output to account for viscosity variations. The fluid flow meter includes a controller with a data storage that is configured to store correlations of fluid pressure, volumetric flow rate and pulse frequency for different viscosities, based on a calibration of the fluid flow meter. A pressure sensor is configured to be connected in parallel to a flow chamber of the fluid flow meter for measuring the pressure across the flow chamber.

24 Claims, 13 Drawing Sheets

(56) References Cited

U.S. PATENT DOCUMENTS

| | | | |
|---|---|---|---|
| 4,829,808 A | 5/1989 | West | |
| 4,976,137 A | 12/1990 | Decker et al. | |
| 5,014,211 A | 5/1991 | Turner et al. | |
| 5,050,094 A | 9/1991 | Kitano | |
| 5,118,008 A | 6/1992 | Williams | |
| 5,275,043 A | 1/1994 | Cotton | |
| 5,315,862 A | 5/1994 | Hasselmann | |
| 5,687,092 A * | 11/1997 | Bretmersky | G05D 7/0635 702/100 |
| 5,746,238 A | 5/1998 | Brady et al. | |
| 5,771,178 A | 6/1998 | Stemporzewski, Jr. et al. | |
| 5,857,589 A | 1/1999 | Cline et al. | |
| 5,895,863 A | 4/1999 | Glaudel et al. | |
| 5,995,909 A * | 11/1999 | Bretmersky | G05D 7/0635 702/50 |
| 6,048,186 A * | 4/2000 | Kitano | G01F 3/10 418/190 |
| 6,089,102 A * | 7/2000 | Bloss | B67D 7/20 702/46 |
| 6,375,434 B1 * | 4/2002 | Taivalkoski | B67D 7/20 417/63 |
| 6,383,237 B1 | 5/2002 | Langer et al. | |
| 6,721,669 B2 | 4/2004 | Kopl et al. | |
| 7,034,937 B2 | 4/2006 | Crudge et al. | |
| 7,177,780 B2 | 2/2007 | Hillam et al. | |
| 7,523,660 B2 | 4/2009 | Albrecht et al. | |
| 8,069,719 B2 | 12/2011 | Tokhtuev et al. | |
| 8,166,828 B2 | 5/2012 | Skirda et al. | |
| 8,590,362 B2 | 11/2013 | Carbone, II et al. | |
| 8,742,883 B2 | 6/2014 | Pelkey et al. | |
| 8,943,901 B2 | 2/2015 | Tokhtuev et al. | |
| 9,051,163 B2 | 6/2015 | Mehus et al. | |
| 9,383,235 B2 | 7/2016 | Tokhtuev et al. | |
| 2002/0035441 A1 | 3/2002 | Ruesch et al. | |
| 2007/0192046 A1 | 8/2007 | Hairston | |
| 2008/0202255 A1 * | 8/2008 | Albrecht | G01F 3/10 73/861.08 |
| 2008/0215259 A1 | 9/2008 | Hairston | |
| 2008/0221822 A1 * | 9/2008 | Laverdiere | G01F 25/0007 702/100 |
| 2008/0295568 A1 | 12/2008 | Nanaji et al. | |
| 2009/0234594 A1 * | 9/2009 | Carlisle | G01F 1/28 702/49 |
| 2009/0314115 A1 | 12/2009 | Breeser | |
| 2010/0199758 A1 * | 8/2010 | Tokhtuev | G01F 3/10 73/261 |
| 2011/0031272 A1 | 2/2011 | Comiskey et al. | |
| 2011/0308888 A1 | 12/2011 | Carothers et al. | |
| 2012/0024080 A1 * | 2/2012 | Carbone, II | B01F 15/00259 73/861.04 |
| 2012/0047988 A1 * | 3/2012 | Mehus | G01F 25/0092 73/1.36 |
| 2012/0049999 A1 * | 3/2012 | Pelkey | G05B 23/0224 340/3.1 |
| 2012/0255367 A1 * | 10/2012 | Kitami | G01F 3/10 73/861.04 |
| 2013/0092704 A1 | 4/2013 | Tincher et al. | |
| 2013/0192678 A1 | 8/2013 | Hammonds | |
| 2014/0034668 A1 | 2/2014 | Carbone, II et al. | |
| 2014/0109644 A1 * | 4/2014 | Carbone, II | G01F 25/0092 73/1.16 |
| 2014/0144249 A1 | 5/2014 | Kirchertz | |
| 2014/0260672 A1 * | 9/2014 | Tokhtuev | G01F 1/72 73/861.77 |
| 2014/0318639 A1 | 10/2014 | Peret et al. | |
| 2015/0168186 A1 * | 6/2015 | Tokhtuev | G01F 1/06 73/861.77 |
| 2016/0258790 A1 | 9/2016 | Tokhtuev et al. | |

FOREIGN PATENT DOCUMENTS

| | | | |
|---|---|---|---|
| CN | 202734883 U | 2/2013 | |
| DE | 102008008427 B3 | 11/2009 | |
| EP | 1403626 A4 * | 11/2006 | G01F 1/80 |
| EP | 2793977 B1 | 11/2015 | |
| FR | 2285597 A1 * | 4/1976 | G01F 3/10 |
| GB | 1384789 A | 4/1972 | |
| GB | 2120792 A | 12/1983 | |
| GB | 2177802 B | 8/1989 | |
| JP | H03-269325 A | 11/1991 | |
| JP | 2002156257 A * | 5/2002 | |
| JP | 2007309726 A * | 11/2007 | |
| WO | 2012126473 A2 | 9/2012 | |
| WO | 2014144557 A2 | 9/2014 | |

OTHER PUBLICATIONS

International Patent Application No. PCT/US2018/043706, International Search Report and Written Opinion dated Oct. 23, 2018, 20 pages.

Firth, Josiah, et al., A novel optical telemetry system applied to flowmeter networks, Flow Measurement and Instrumentation 48 (2016) 15-19, Elsevier, journal homepage: www.elsevier.com/locate/flowmeasinst, 5 pages.

Shelley, Suzanne, Choosing the Best Flowmeter: Here are the pros and cons of six popular flowmeter technologies, Chemical Engineering, New York 106.7, Jul. 1999, 13 pages.

Machine Translation of Description of Chinese Application No. CN202188872, Patent Translate, Powered by EPO and Google, transalated Jan. 12, 2017, 4 pages.

Tokhtuev, Eugene, U.S. Appl. No. 15/658,437 entitled "Fluid Flow Meter with Normalized Output," filed Jul. 25, 2017, 37 pages.

Tokhtuev, Eugene, U.S. Appl. No. 15/658,435 entitled "Fluid Flow Meter with Linearization," filed Jul. 25, 2017, 39 pages.

* cited by examiner

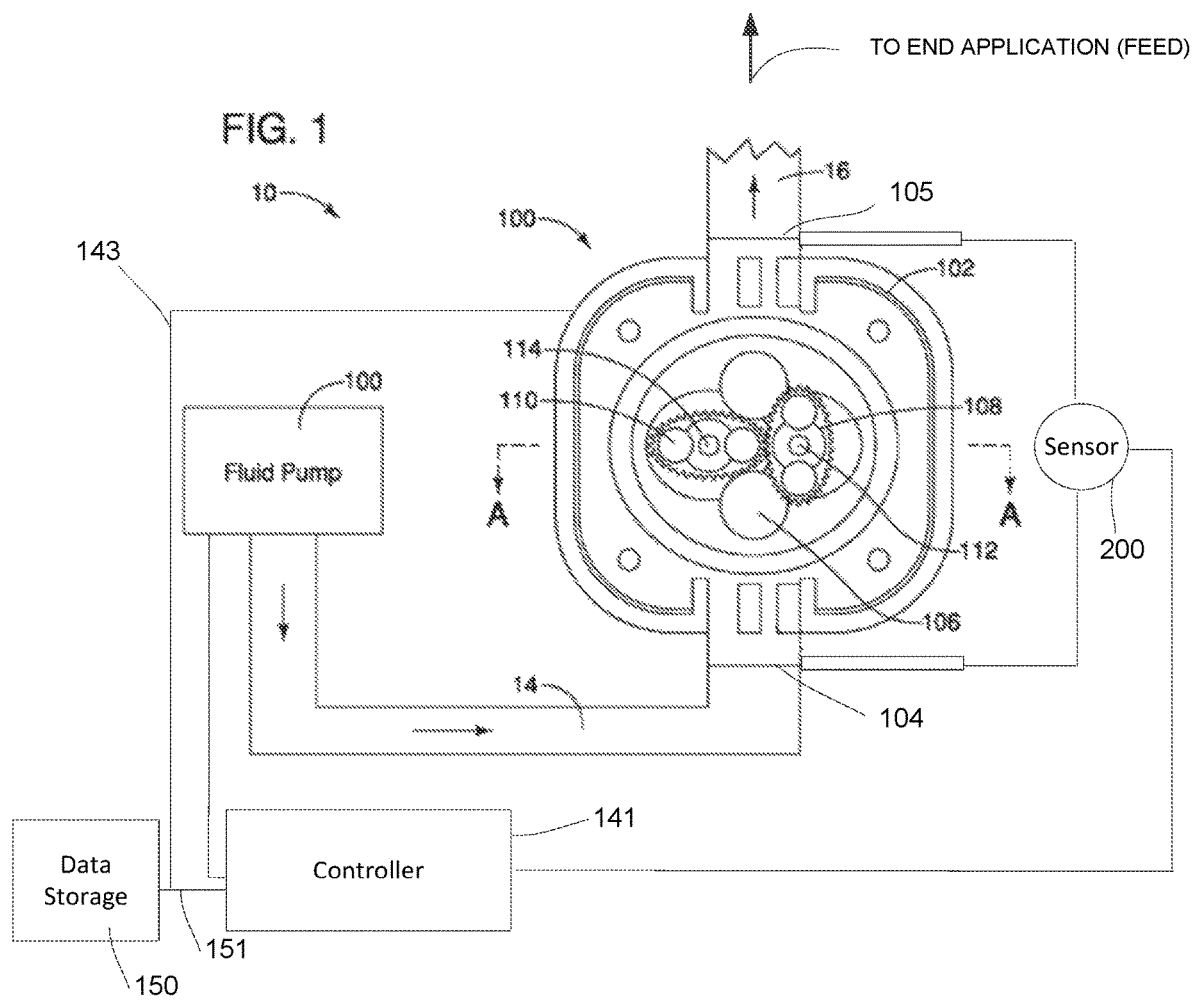
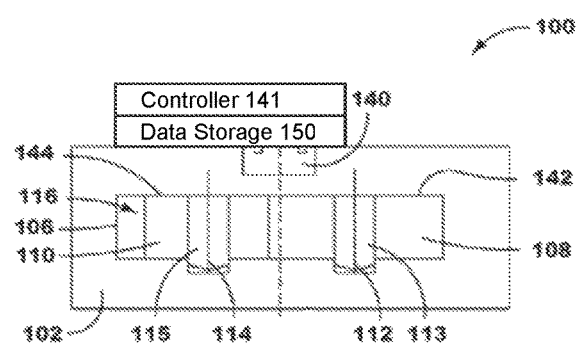

--Prior Art--

FIG. 4A
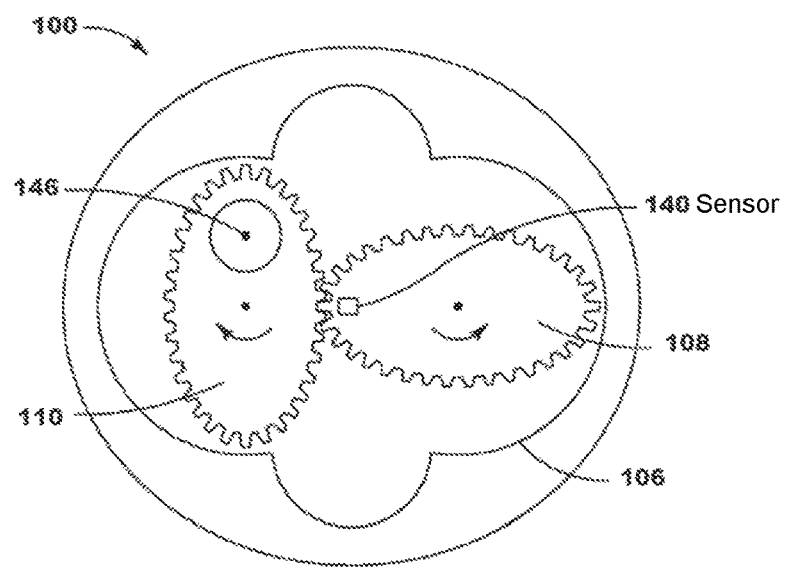
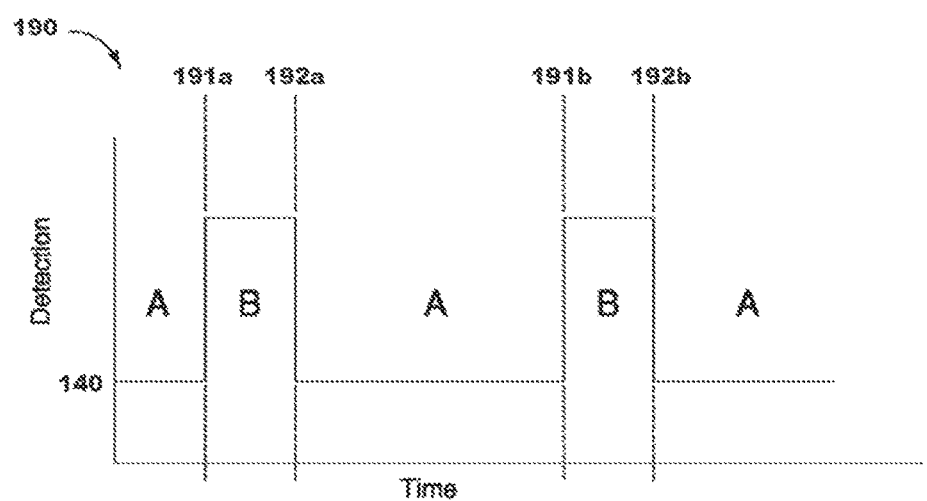
FIG. 4B
--Prior Art--

| Current state | Next valid state |
|---|---|
| A | B |
| B | C |
| C | D |
| D | E |
| E | F |
| F | G |
| G | H |
| H | A |

FLUID FLOW METER WITH VISCOSITY CORRECTION

PRIORITY CLAIM

This application claims the benefit of priority of U.S. 62/536,503, filed on Jul. 25, 2017, the entire contents of which is hereby incorporated by reference.

BACKGROUND

Positive displacement fluid measurement systems may be used to measure a flow rate or volume of a fluid or gas. For example, dispensing systems may use feedback from a positive displacement fluid meter to control the volume of fluid dispensed. Such control systems are often used in lieu of time-on controls to more accurately dispense precise amounts of fluid or gas and is commonly used in a variety of settings including, but not limited to, the industrial, healthcare, pharmaceutical and food and beverage industries. For example, a positive displacement fluid meter may be used in the manufacturing process of a drug which requires accurate measurement of two materials to be mixed into a single batch. The positive displacement fluid meter may be installed in the supply lines of the respective materials and feedback from the meters may be used to dispense the appropriate amount of each material into a blend tank to be mixed. This application of a positive displacement meter, like many others, may require the positive displacement meter to have an accuracy of measurement (e.g., +/−0.5%) to comply with quality control or regulations, for example. Accordingly, a positive displacement meter that accurately measures a volume of fluid or gas can help facilitate performing intended function of a fluid dispensing system or process.

An example fluid flow meter is described in the commonly-assigned application, U.S. Pat. No. 9,383,235, assigned to Ecolab Inc., St. Paul, Minn., the disclosure of which is hereby incorporated by reference. Manufacturers typically provide a factory calibration which correlates the volume of a pocket of fluid to a rotational count corresponding to rotation of one or more components (e.g., oval gears) in the flow meter for various volumes of flows. Thus, by counting the number of pulses produced by the fluid flow meter, the volume flow rate can be determined based on the factory calibration.

Factory calibration of fluid flow meters is typically not corrected for viscosity of the fluid. In use, for instance, the fluid flow meter may supply products (e.g., chemicals such as acetone) that may have viscosity that varies over time, for instance, due to product deterioration. If the viscosity variation of the product is unknown, the quantity of product metered using the fluid flow meter, for instance, may not be accurate, or may be less desirable for the end application at hand (e.g., because of under-feeding or over-feeding).

SUMMARY

In one aspect, this disclosure is directed to a fluid flow meter having a first gear intermeshing with a second gear, and in synchronous rotation with each other in response to flow of a fluid through the fluid flow meter. The fluid flow meter includes a controller being configured to generate pulses in response to the passage of the quantity of fluid and/or synchronous rotation of the first gear and the second gear. The controller can have a data storage. The data storage can store correlations of fluid pressure, volumetric flow rate and pulse frequency, based on a calibration of the fluid flow meter. During calibration, the controller can determine such correlations by receiving measurements corresponding to a fluid pressure from a pressure sensor and by determining pulse frequency of the generated pulses for flow of a known volumetric flow rate of fluid.

In another aspect, the fluid flow meter comprises a fluid inlet and a fluid outlet positioned downstream of the fluid inlet. A flow chamber can be positioned between the fluid inlet and the fluid outlet for receiving a fluid. A pressure sensor can be connected in parallel to the flow chamber and configured to measure the pressure across the flow chamber. In such cases, the pressure stored in the data storage corresponds to the pressure measured by the pressure sensor. Accordingly, the controller can be configured to determine an unknown volumetric flow rate based on pulse frequency and pressure measured across the flow chamber measured by the pressure sensor.

In another aspect, a method of measuring a volumetric flow rate of fluid of unknown viscosity can comprise the step of providing a flow meter according to any of the embodiments disclosed herein. The method can include the step of generating, using the controller, pulses corresponding to rotation of the first gear and the second gear. The pulses can have a pulse frequency associated therewith. The method can include the step of measuring fluid pressure of the fluid flowing through the flow chamber. The method includes the step of determining using the controller, pulse frequency corresponding to the known volumetric flow rate of fluid. The method can also include the step of generating, using the controller, correlations between pulse frequency, fluid pressure and known volumetric flow rate for various volumetric flow rates and storing the generated correlations in the data storage.

Embodiments of the present disclosure include one or more of the following numbered embodiments:

1. A fluid flow meter, comprising:
   a flow chamber;
   a first gear intermeshing with a second gear, the first gear and the second gear being positioned within the flow chamber, the intermeshing of the first gear and the second gear permitting synchronous rotation of the first gear and the second gear in response to flow of a fluid through the flow chamber; and
   a controller being configured to generate pulses in response to the passage of fluid through the flow chamber and/or synchronous rotation of the first gear and the second gear, the controller having a data storage, the pulses having a pulse frequency associated therewith,
   the data storage being configured to store correlations of:
   a) fluid pressure, and
   b) volume per pulse or volumetric flow rate, and
   c) time period between pulses or pulse frequency,
   the controller being configured to determine the correlations by receiving a measured value of a fluid pressure from a pressure sensor and determining:
   a value of pulse frequency for a known volumetric flow rate of fluid, or
   time period between pulses for a known volume per pulse,
   the controller being configured to determine an unknown volume per pulse or an unknown volumetric flow rate by:
   receiving fluid pressure and determining:
   time period between the generated pulses corresponding to the unknown volume per pulse or pulse frequency of the generated pulses corresponding to the unknown volumetric flow rate, and retrieving from the data storage:

a volume per pulse correlated with the measured value of fluid pressure and the determined value of time period between pulses, or a volumetric flow rate correlated with the measured value of fluid pressure and the determined value of pulse frequency.

2. The fluid flow meter of embodiment 1, wherein the data storage is configured to store correlations of fluid pressure, volumetric flow rate and pulse frequency for fluids of different viscosities.

3. A fluid flow meter, comprising:

a fluid inlet;

a fluid outlet positioned downstream of the fluid inlet;

a flow chamber positioned between the fluid inlet and the fluid outlet, the flow chamber being configured for receiving a fluid;

a controller being configured to generate pulses in response to the passage of the fluid through the flow chamber, the controller having a data storage; and a pressure sensor connected in parallel to the flow chamber and configured to measure the pressure across the flow chamber, the data storage being configured to store correlations of pressure, volumetric flow rate and pulse frequency, and the controller being configured to determine an unknown volumetric flow rate based on pulse frequency and pressure across the flow chamber measured by the pressure sensor.

4. The fluid flow meter of embodiment 3 or any previous embodiment, wherein the fluid flow meter is a positive displacement flow meter.

5. The fluid flow meter of embodiment 4 or any previous embodiment, wherein the fluid flow meter is an oval-gear meter.

6. The fluid flow meter of embodiment 5 or any previous embodiment, further comprising a first gear intermeshing with a second gear, the intermeshing of the first gear and the second gear permitting synchronous rotation of the first gear and the second gear in response to the flow of fluid through the flow chamber.

7. The fluid flow meter of embodiment 6 or any previous embodiment, wherein at least one of the first gear and the second gear have a detectable area for detecting a rotational position of the first gear and the second gear when the fluid passes through the flow chamber.

8. The fluid flow meter of embodiment 7 or any previous embodiment, further comprising one or more non-contact sensors configured to sense the detectable area when the first gear and second gear are in the rotational position, the one or more non-contact sensors being further configured to generate a detection signal, and the detection signal being indicative of a position of the detectable area relative to the at least one non-contact sensor.

9. The fluid flow meter of embodiment 8 or any previous embodiment, wherein the controller is configured to generate pulses when the detection signal is indicative of the first gear and the second gear rotating from a first valid rotational state to a second valid rotational state.

10. The fluid flow meter of embodiment 9 or any previous embodiment, wherein the controller is configured to not generate pulses when the detection signal is indicative of the first gear and the second gear rotating from the first valid rotational state to an invalid rotational state.

11. The fluid flow meter of embodiment 3 or any previous embodiment, wherein the data storage being configured to store correlations of pressure, volumetric flow rate and pulse frequency in the form of a lookup table.

12. The fluid flow meter of embodiment 11 or any previous embodiment, wherein the correlations of pressure, volumetric flow rate and pulse frequency are non-linear.

13. The fluid flow meter of embodiment 3 or any previous embodiment, wherein the pressure sensor is configured to measure a differential pressure across the flow chamber, the differential pressure corresponding to the difference in fluid pressure at the fluid inlet and the fluid outlet.

14. The fluid flow meter of embodiment 3 or any previous embodiment, wherein the fluid passing through the flow chamber has a viscosity that is unknown.

15. The fluid flow meter of embodiment 3 or any previous embodiment, wherein the fluid passing through the flow chamber has a viscosity that is variable.

16. A method of measuring a volumetric flow rate of fluid of unknown viscosity, comprising:

providing fluid flow meter, the fluid flow meter comprising:

a flow chamber, a first gear intermeshing with a second gear, the first gear and the second gear being positioned within the flow chamber, the intermeshing of the first gear and the second gear permitting synchronous rotation of the first gear and the second gear in response to the flow of fluid through the flow chamber, and a controller having a data storage;

supplying a known volumetric flow rate of fluid through the flow chamber;

generating, using the controller, pulses corresponding to rotation of the first gear and the second gear, the pulses having a pulse frequency associated therewith;

measuring fluid pressure of the fluid flowing through the flow chamber;

determining, using the controller, pulse frequency corresponding to the known volumetric flow rate of fluid;

generating, using the controller, correlations between pulse frequency, fluid pressure and known volumetric flow rate for various volumetric flow rates; and storing the generated correlations in the data storage.

17. The method of embodiment 16 or any previous embodiment, further comprising, determining, using the controller, an unknown volumetric flow rate by measuring fluid pressure and determining the pulse frequency.

18. The method of embodiment 17 or any previous embodiment, further comprising, retrieving from the data storage, a volumetric flow rate correlated with a measured value of fluid pressure and a determined value of pulse frequency.

19. The method of embodiment 16 or any previous embodiment, further comprising, generating, using the controller, correlations between pulse frequency, fluid pressure and known volumetric flow rate for fluids of different known viscosities.

20. The method of embodiment 19 or any previous embodiment, further comprising, determining, using the controller, an unknown viscosity based on a measured value of pressure and a determined value of pulse frequency, and retrieving previously generated correlations stored in the data storage to determine the unknown viscosity.

21. The method of embodiment 19 or any previous embodiment, further comprising, generating, using the controller, an indication signal when the viscosity of the fluid is determined to be outside a predefined range.
22. The method of embodiment 15 or any previous embodiment, further comprising, generating pulses only when the first gear and the second gear rotate from a first valid rotational position to a second valid rotational position.
23. The method of embodiment 22 or any previous embodiment, further comprising, generating pulses having a pulse duration less than a transition time, whereby the transition time corresponds to the time taken by the first gear and the second gear to rotate from the first valid rotational position to the second valid rotational position.
24. The method of embodiment 23 or any previous embodiment, wherein, the controller determines the pulse frequency as the inverse of a time interval between adjacent pulses.
25. The fluid flow meter of embodiment 1 or any previous embodiment, wherein the controller is configured to determine a total volume of fluid flowing through the fluid flow meter over a time interval by performing the following steps each time a pulse is generated:
retrieving from the data storage, the volume per pulse correlated with the measured value of fluid pressure, and
adding the retrieved volume per pulse to a total volume counter.
26. The fluid flow meter of embodiment 3 or any previous embodiment, wherein the pressure sensor is configured to measure the pressure over a period of time corresponding to the time between two consecutive pulses.
27. The fluid flow meter of embodiment 3 or any previous embodiment, wherein the pressure sensor is configured to measure the pressure over a period of time corresponding to several pulses.
28. The fluid flow meter of embodiment 27 or any previous embodiment, wherein the controller is configured to determine an average value of pressure based on the measured pressure over several pulses, and retrieve correlations from the data storage based on the average value of pressure.

The details of one or more examples are set forth in the accompanying drawings and the description below. Other features, objects, and advantages will be apparent from the description and drawings, and from the claims.

BRIEF DESCRIPTION OF DRAWINGS

FIG. 1 is a schematic of a fluid flow meter according to an embodiment;
FIG. 2 is a cross-sectional side view of the fluid flow meter taken along the sectional plane A-A illustrated in FIG. 1;
FIG. 4A is another sectional-plan view illustrating the fluid flow meter with non-contact sensors;
FIG. 4B is a schematic illustrating detection signals generated by the non-contact sensors shown in FIG. 4A.

DETAILED DESCRIPTION

Figure 3A:
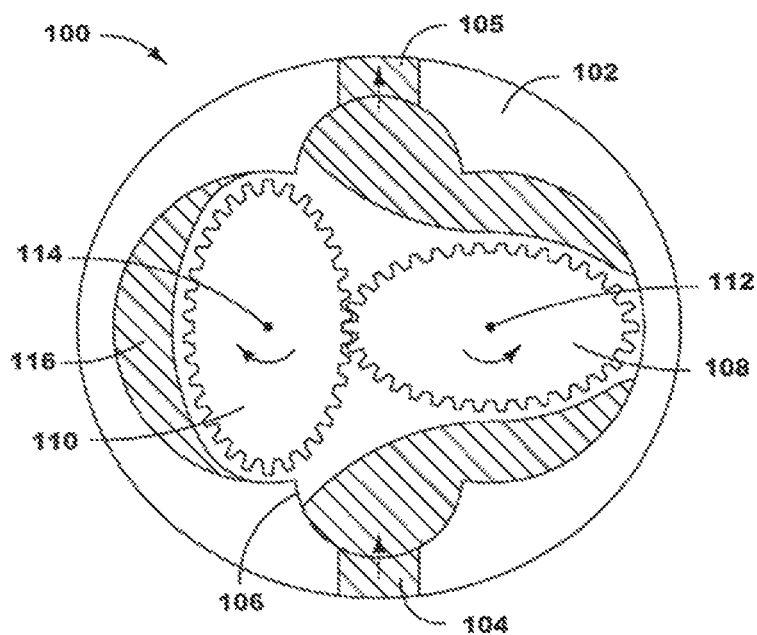
FIG. 3A is a sectional-plan view illustrating fluid flow through the fluid flow meter at a first rotational position of the oval gears.

FIG. 1 is a top plan view of a fluid flow measurement system 10 including a fluid flow meter 100. System 10 includes a fluid pump 12, a first fluid line 14, a second fluid line 16 and a fluid flow meter 100. First fluid line 14 may be in fluid communication with fluid pump 12 configured to provide a fluid flow through system 10. Fluid pump 12 may be in fluid communication with a fluid source (not shown) and may be any suitable pump to provide a fluid flow through the system. The fluid flow may have a variety of fluid flow characteristics and may depend on the type of pump selected or the application of system 10. For example, different applications may require either a high fluid flow volume or a low fluid flow volume. Certain examples may require uniform fluid flow provided by a peristaltic pump or pressure-maintained fluid lines. In other examples, a fluid pump 12 may provide non-uniform fluid flow particularly where the application requires a low fluid volume.

Fluid flow meter 100 may be configured to measure fluid flow through system 10 and may include a housing 102 defining a chamber 106, a fluid inlet 104 and a fluid outlet 105. In the illustrated embodiment, fluid flow meter 100 is a positive displacement meter, such as an oval gear 108 flow meter. Fluid inlet 104 may be in fluid communication with first fluid line 14 and provides fluid flow from the first fluid line 14 into chamber 106. Oval gears 108 and 110 are installed within chamber 106 and are configured to rotate in concert about fixed axes of rotation 112 and 114, respectively, in response to fluid flow through the chamber 106. Fluid exits chamber 106 by way of fluid outlet 105 which is in fluid communication with second fluid line 16.

Accordingly, fluid provided by fluid pump 12 flows through fluid line 14 and into fluid flow meter 100 through fluid inlet 104. The fluid then flows through fluid flow meter 100, wherein the volume of flow is measured, and out of the fluid flow meter 100 through fluid outlet 105 and into second fluid line 16.

FIG. 2 is a cross-sectional side view of the fluid flow meter 100 taken along line A-A shown in FIG. 1. Oval gears 108 and 110 installed within the chamber 106 defined by housing 102 and may be configured to rotate about axes 113 and 115, respectively. In the illustrated embodiments, fluid flow meter 100 may include non-contact sensor 140 and controller 141. The non-contact sensor 140 may be in communication (e.g., electrically by way of connection 143, or wirelessly) with the controller 141. Non-contact sensor 140 may be configured to sense a detectable area 146 (not shown) provided on top surfaces 142 and 144 of oval gears 108 and 110, respectively. For example, non-contact sensor 140 may be a magnetic sensor configured to sense a detectable area 146 comprising a magnet installed on or within at least one of the oval gears 108. In another example, non-contact sensor 140 may be an optical sensor configured to emit a wavelength onto at least one top surface 142 or 244 of the oval gears 108 including a detectable area 146 and sense a reflectance of the wavelength off at least one of the top surfaces. U.S. Pat. No. 7,523,660, filed Dec. 19, 2007, and U.S. Pat. No. 8,069,719, filed Feb. 11, 2009, provides examples of oval gears 108 incorporating non-contact sensors, the entire disclosure of each is hereby incorporated herein by reference. It can be appreciated that fluid flow meter 100 may include any number of non-contact sensors and any number of detectable areas suitable for a particular application of the meter. Non-contact sensor 140 may also be configured to generate a detection signal based on the detection, or lack of detection, of a detectable area 146.

Fluid flow meter 100 may also include controller 141 configured to calculate a volume of fluid flow through the meter based on the detection signal of non-contact sensor 140. The controller 141 may be configured to receive a detection signal of non-contact sensor 140 and generate pulses to correspond to the rotation of the oval gears 108 based on the detection signal. The controller 141 can be a programmable computer such as a microprocessor, a programmable logic controller 141, and the like, and can include (and/or be in communication with) on-board or remote non-transitory storage media (e.g., a data storage 150) for storing instructions in the form of algorithms and/or data (e.g., calibration data). The controller can also be application specific integrated circuits (ASICs), microcontrollers, microprocessors, field-programmable gate arrays (FPGAs), or any other appropriate structure capable of receiving and processing data, as well as, circuitry distributed across a network to receive and process data and control system operation as described herein from a remote location. While an electrical connection 151 between the controller 141 and a data storage 150 is illustrated, it should be understood that the wireless connections between the controller 141 and the data storage 150 are contemplated.

Further, it should be understood that while the electrical connections of the controller 141, data storage 150 and the fluid flow meter 100 are illustrated as being outside the housing 102 of the fluid flow meter 100 in FIG. 1, in FIG. 2, the controller 141 and the data storage 150 (along with associated connections) are housed within the housing 102 of the fluid flow meter 100 (as shown in FIG. 2). As will be discussed further herein, a volume of fluid passing through the fluid flow meter 100 may be calculated when the number of rotations (complete and partially complete) made by the oval gears 108 is known and a volume of fluid per rotation is known. Accordingly, controller 141 may be able to measure a volume of fluid passing through the meter based on the pulses generated by the controller 141. In such cases, controller 141 may include a data storage 150 that stores a calibration between pulses generated and volume of fluid passing through the fluid flow meter 100.

Figure 3B:
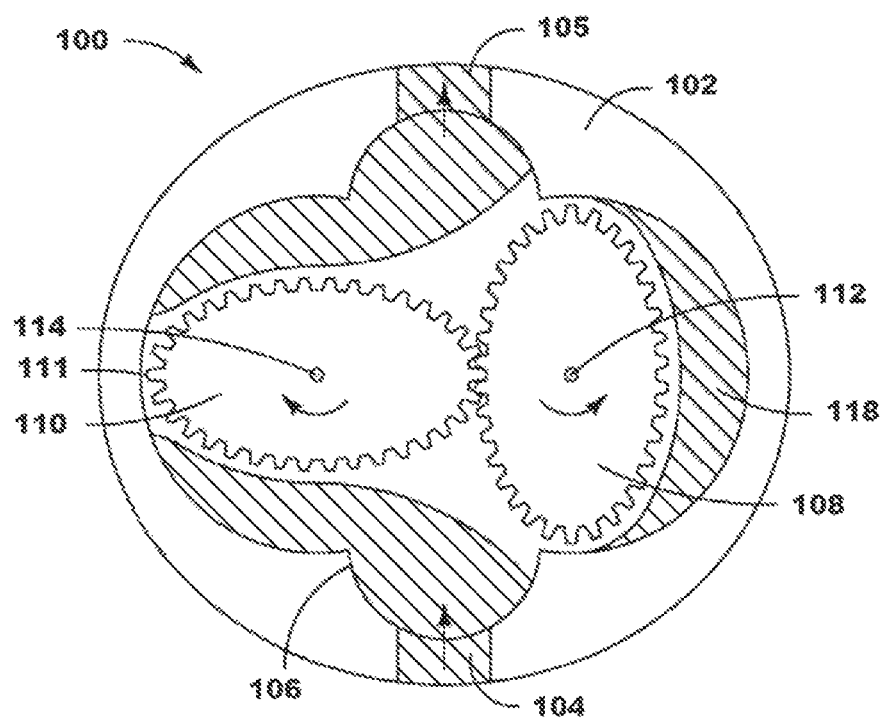
FIG. 3B is a sectional-plan view illustrating fluid flow through the fluid flow meter at a second rotational position of the oval gears.

FIGS. 3A and 3B are sectional-plan views illustrating fluid flow through the fluid flow meter 100. As seen therein, oval gears 108 and 110 are configured to intermesh thereby reducing the chances of fluid from fluid inlet 104 to pass between the gears. Accordingly fluid flows around the oval gears 108 by way of fluid pockets 116 and 118. FIG. 3A shows fluid flow meter 100 in a first rotational position where in fluid may be introduced into chamber 106 through fluid inlet 104. As noted above, the intermeshing of oval gears 108 and 110 reducing the chances of fluid from passing in between the gears thereby forcing the incoming fluid towards a vertex 109 of oval gear 108 and urging oval gear 108 to rotate in a counter-clockwise direction. The counter-clockwise torque applied across oval gear 108 in turn urges the clockwise rotation of oval gear 110.

FIG. 3B shows fluid flow meter 100 in a radially advanced rotational position relative to the rotational position shown in FIG. 3A, wherein oval gear 108 has rotated 90 degrees counter-clockwise and oval gear 110 has rotated 90 degrees clockwise. In this rotational position of fluid flow meter 100, the rotation of oval gear 108 has formed fluid pocket 118 defined by the surface of oval gear 108 and a wall of chamber 106. Concurrently, fluid from fluid inlet 104 is forced toward a vertex 111 of oval gear 110 thereby urging oval gear 110 to rotate in a clockwise direction. This in turn urges oval gear 108 to continue rotation in a counter-clockwise direction to release the fluid in fluid pocket 118. It can be appreciated that a similar fluid pocket 116 may be formed between oval gear 110 and a wall of chamber 106, as shown in FIG. 3A.

Fluid flow meters according to the present embodiments may be configured to increase the resolution of measurement thereby allowing a more precise measurement of fluid flow through the meter. These configurations may be useful in low fluid flow applications. In one example, the fluid flow meter 100 may be configured measure half rotations of the oval gears 108 which correspond to a volume equal to the volume of two fluid pockets 116. In another example, the fluid flow meter 100 may be configured to measure quarter rotations of the oval gears 108 which correspond to a volume equal to one fluid pocket 116. The resolution of measurement of fluid flow meter 100 may also depend on the volume of fluid pockets 116 of the meter. Generally, fluid pockets 116 with a smaller volume may increase the measurement resolution of an oval gear 108 as smaller volumes of fluid are dispensed per rotation of the oval gears 108. Conversely, larger fluid pockets 116 may decrease the resolution as larger volumes of fluid are dispensed per rotation. It can be appreciated that different applications may require a different measurement resolution and examples of the present application may be configured to have a wide range of resolutions.

FIG. 4A is a sectional plan view of the fluid flow meter 100 including a non-contact sensor 140 and a detectable area 146. Non-contact sensor 140 may be configured to sense detectable area 146 provided on a surface of oval gear 110 and generate a detection signal. Non-contact sensor 140 may be mounted in a housing (102, not shown in FIG. 4A) of fluid flow meter 100 positioned above the top surfaces 142, 144 of oval gears 108 and 110. As indicated in FIG. 4A oval gear 108 and 110 are configured to rotate counter-clockwise and clockwise, respectively, in response to fluid flow through chamber 106. The rotation of oval gear 110 causes detectable area 146 to pass through a sensing region of non-contact sensor 140 that may be located underneath the sensor. Upon sensing detectable area 146, non-contact sensor 140 may generate a detection signal. Thus, a detection signal of non-contact sensor 140 may be indicative of a rotational position of oval gears 108 and 110 wherein detectable area 146 is underneath non-contact sensor 140. In this example, non-contact sensor 140 may be configured to generate a "positive" signal (hereinafter also referred to as "1" or "high") when the sensor senses the detectable area 146 and a "negative" signal (hereinafter also referred to as "0" or "low") when the sensor does not sense the detectable area 146. It can be appreciated that the detection signal generated by a non-contact sensor 140 may be of any form in any format suitable for indicating a sensing of a detectable area 146. In certain examples, a non-contact sensor 140 may be configured to not generate a detection signal when a detectable area 146 is not sensed. In such an example, the lack of a signal may still be indicative of a rotational position wherein the detectable area 146 is not within a sensing region of the sensor. As described previously, the fluid flow meter 100 may include a controller 141 configured to generate a pulsed output based on the detection signal provided by non-contact sensor 140. In this example, fluid flow meter 100 is configured such that rotation of oval gears 108 and 110 may cause non-contact sensor 140 to sense detectable area 146. Thus, the controller 141 may be configured to generate a pulse in response to the detectable area 146 being sensed by the non-contact sensor 140, as will be described further below.

FIG. 4B is a plot 190 of a detection signal of non-contact sensor 140 of fluid flow meter 100 over time according to an example. More specifically, plot 190 shows the detection signal of non-contact sensor 140 sensing detectable area 146 as oval gears 108 and 110 rotate in a forward direction in response to fluid flow through the meter. Plot 190 includes time points 191a, 491b, 492a and 492b. Initially, the detection signal of non-contact sensor 140 is low indicating that oval gears 108 and 110 are in a rotational position wherein the detectable area 146 is not within a sensing region of the sensor. The detection signal is high between time points 191a and 192a, and also 191b and 192b, and is indicative of rotational positions of the oval gears 108 wherein the detectable area 146 is sensed by non-contact sensor 140. The detection signal becomes low again between time points 192a and 191b, and also after time point 192b, and is indicative of rotational positions of the oval gears 108 wherein the detectable area 146 is not sensed by the sensor. The time period between time points 181a and 181b, or alternatively, 182a and 182b, may represent all the rotational positions in one full rotation of oval gears 108 and 110 as there is a single detectable area 146 in fluid flow meter 100. Additional or fewer rotational positions and/or detectable areas are contemplated within the scope of the present disclosure (and as will be described further below).

In this example, the rotational positions of the oval gears 108 in one full rotation of fluid flow meter 100 may be categorized into rotation states A and B. Rotation state A comprises all the rotational positions wherein detectable area 146 is not sensed by non-contact sensor 140 and is shown in plot 190 before time point 191a, between time points 192a and 191b, and also after time point 192b. Rotation state B comprises all the rotational positions wherein the detectable area 146 is sensed by the non-contact sensor 140 and is shown in plot 190 between time points 191a and 192a, as well as 191b and 192b. When non-contact sensor 140 senses rotation state A and B, it generates a negative and positive detection signal, respectively. In such examples, the fluid flow meter 100 may include a controller 141 configured to calculate a volume of fluid flow through the meter by based on the detection signals provided by non-contact sensor 140. As oval gears 108 and 110 rotate in a forward direction in response to fluid flow through the meter, the gears eventually reach a rotational position wherein detectable area 146 is within a sensing region of the non-contact sensor 140. Accordingly, non-contact sensor 140 may sense rotation state B. It can be appreciated as the oval gears 108 continue to rotate in fluid flow meter 100, non-contact sensor 140 senses a sequence of rotation states comprising rotation state A and B, in order. As noted above, non-contact sensor 140 may be configured to generate a negative detection signal and a positive detection signal when rotation state A and B are sensed, respectively, and provide the signals to controller 141.

Concurrently, controller 141 of fluid flow meter 100 is configured to receive the detection signal from non-contact sensor 140 and produce a pulsed output. Upon receiving a detection signal indicative of both a rotation state and a rotational position of oval gears 108 and 110, the controller 141 determines in step 187 whether the detection signal is positive. If the detection signal is positive then the controller 141 may generate one or more pulses and returns back to receiving state 186. If the detection signal is negative, then the controller 141 returns back to receiving state 186 without generating any pulses. Referring back to FIG. 4B, it can be appreciated that pulses can be generated by controller 141 at time points 191a and 191b when the detection signal goes from low to high. Alternatively, the controller 141 can be configured to generate pulses when the detection signal goes from high to low (e.g., at time points 192a and 192b) by modifying step 187 to check to see if the detection signal is negative.

Embodiments described in FIGS. 1-4B can use algorithms that produce a pulsed output in response to the rotation of the oval gear 108 flow meter. For instance, in the embodiments described in FIGS. 1-4B, the controller 141 can be programmed with instructions that cause the controller 141 to generate a pulse. In such cases, the accuracy and resolution of the flow meter can be improved by generating pulses that correspond to individual transition of the gears from a valid rotational state to another valid rotational state. FIG. 4C is a flow chart corresponding to one such algorithm 400.

Figure 4C:
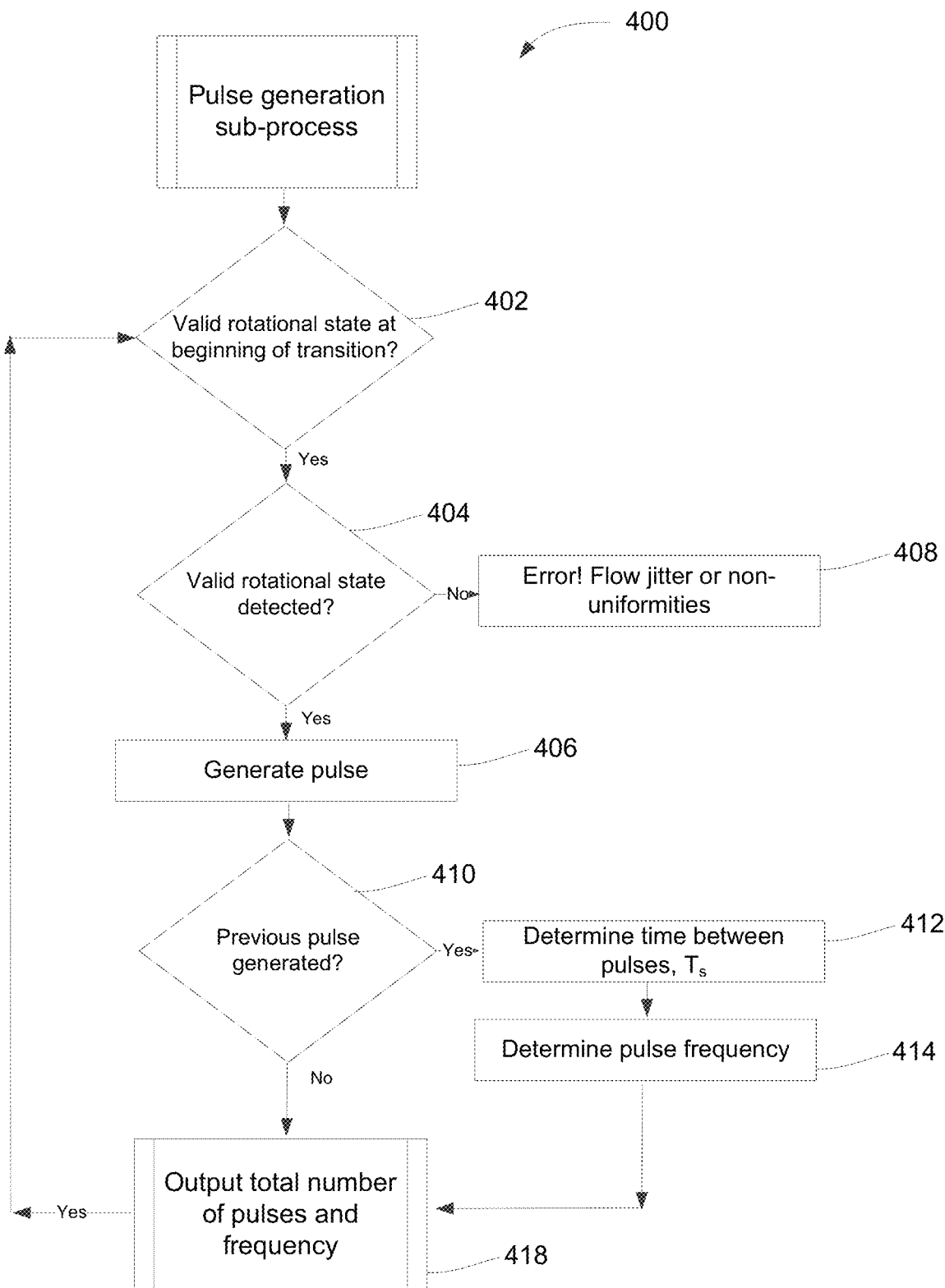
FIG. 4C is a schematic illustrating a pulse-generation method according to an embodiment.
Figures 4D, 4E:
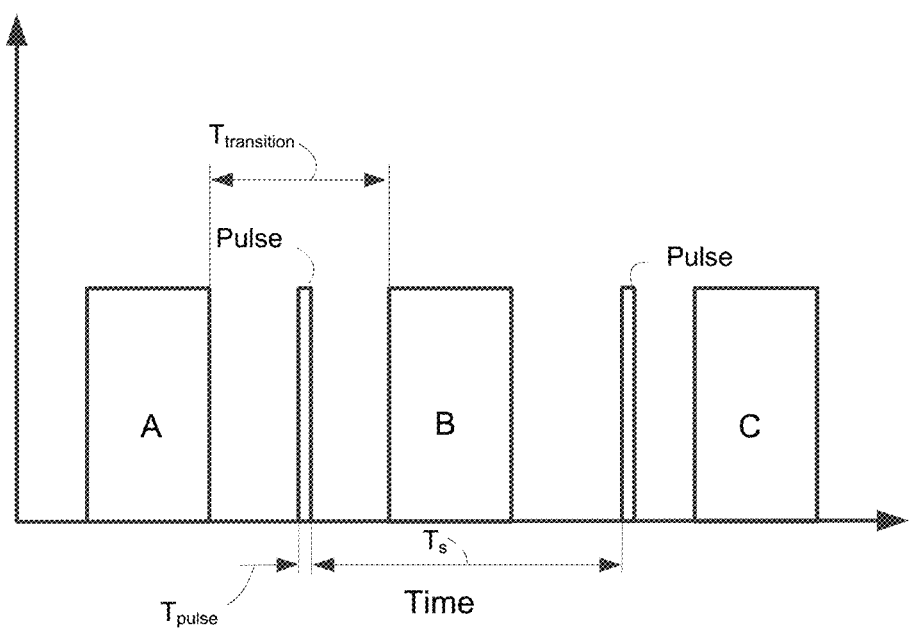
FIG. 4D is a schematic illustrating a sequence of valid rotational states of the oval gears of the fluid flow meter according to a non-limiting illustrative embodiment.
FIG. 4E is a plot illustrating a time of pulse $T_{pulse}$, transition time between pulse $T_{transition}$ according to a non-limiting illustrative embodiment.

In the example illustrated in FIG. 4C, the oval gear 108 meter can have eight rotational states for every full rotation of the oval gears 108. For instance, the eight rotational states can be referred to as states A, B, C, D, E, F, G and H. FIG. 4D illustrates a chart that shows valid states in the sequence. In such cases, the controller 141 of the oval gear 108 meter can be programmed according to the algorithm of FIG. 4C, whereby the controller 141 is configured at step 402 to determine if the rotational state detected (e.g., by the non-contact sensor 140) is a valid rotational state. The controller 141 is then configured to determine (at step 404) if the oval gears 108 transition from a valid rotational state to another valid rotational state, according to the chart 4D. If for instance, the oval gears 108 transition from state A to state B, the controller 141 is configured to determine that the transition is valid, and generate a pulse at step 406. If on the other hand, the controller 141 determines that the transition is invalid (for instance, a state other than the states listed in right column of FIG. 4D for each corresponding state), then the controller 141 may not generate a pulse (corresponding to an error condition 408). Accordingly, in this example, the controller 141 will be configured to generate eight pulses for a full rotation of the gears, corresponding to eight valid transitions between rotational states. While eight valid rotational states are illustrated, it should be noted that additional or fewer rotational states (corresponding to additional or fewer transitions and pulses) respectively are contemplated within the scope of the present disclosure. Such embodiments facilitate accuracy of measurement and eliminate errors in measurement due to flow non-uniformities (such as jitter or backflow).

In certain embodiments, the controller 141 is configured to generate pulses of duration shorter than time for transition from a valid rotational state to the next valid rotational state. In such cases, if the gears rotate "n" rotations per second, with "m" valid rotational states, the time taken by the oval gears 108 to transition from a valid rotational state to the next valid rotational state is given by equation (1) below:

$$T_{transition} = \frac{1}{m \times n} \quad (1)$$

In such cases, the controller 141 can be configured to set generate pulses having a pulse duration ($T_{pulse}$) less than the transition time from a valid rotational state to the next valid rotational state:

$$T_{Pulse} < T_{transition} \quad (2)$$

Such embodiments may facilitate in an accurate pulse count by reducing any overlap that may occur between transition of gears into one or more rotation states and pulse generation. In operation, each time the oval gears 108 transition from a valid rotational state to another valid rotational state, the controller 141 generates a pulse having a pulse duration $T_{pulse}$. The time interval between adjacent pulses can be $T_s$. In such cases, a pulse frequency $F_s$ can be defined, whereby the pulse frequency is the inverse of the time interval of adjacent pulses: In the illustrated example, the fluid flow meter 100 has eight valid rotational states (as illustrated in FIG. 4D). If, for instance, the oval gears 108 have 100 rotation per second, the transition time from one rotational state to next about 1.25 milliseconds in accordance with the above-expression. Accordingly, the controller 141 may generate pulses having a duration of between about 0.1 and about 0.5 ms. More generally, the pulse duration ($T_{pulse}$) can be between about 5% and about 50% of the transition time ($T_{transition}$).

$$Fs = \frac{1}{T_S + T_{pulse}} \quad (3)$$

Referring again to FIG. 4C, the controller 141 may check, at step 410 if previous pulses were generated. In such cases, the controller 141 may determine, at step 412, the time interval between adjacent pulses, $T_s$ and frequency $F_s$ at step 414. At step 416, relevant data, such as pulse count, time interval between pulses and/or the frequency are output.

While the examples below relate to the illustrated fluid flow meter 100 of FIGS. 1-4B, it should be understood the examples described herein would apply to other types of positive displacement meters that produce a pulsed output. In some such example embodiments, the controller 141 can generate pulses in response to the passage of the quantity of fluid through the flow chamber 106, and/or the displacement of rotating components of the fluid flow meter 100. For instance, the controller 141 can generate pulses in response to the synchronous rotation of the first gear and the second gear as detected by the non-contact sensors. The controller 141 can also be configured to determine the pulse frequency $F_s$ for a wide range of known operating conditions and volumetric flow rates to establish calibration data that can be stored in the data storage 150.

Figure 5A:
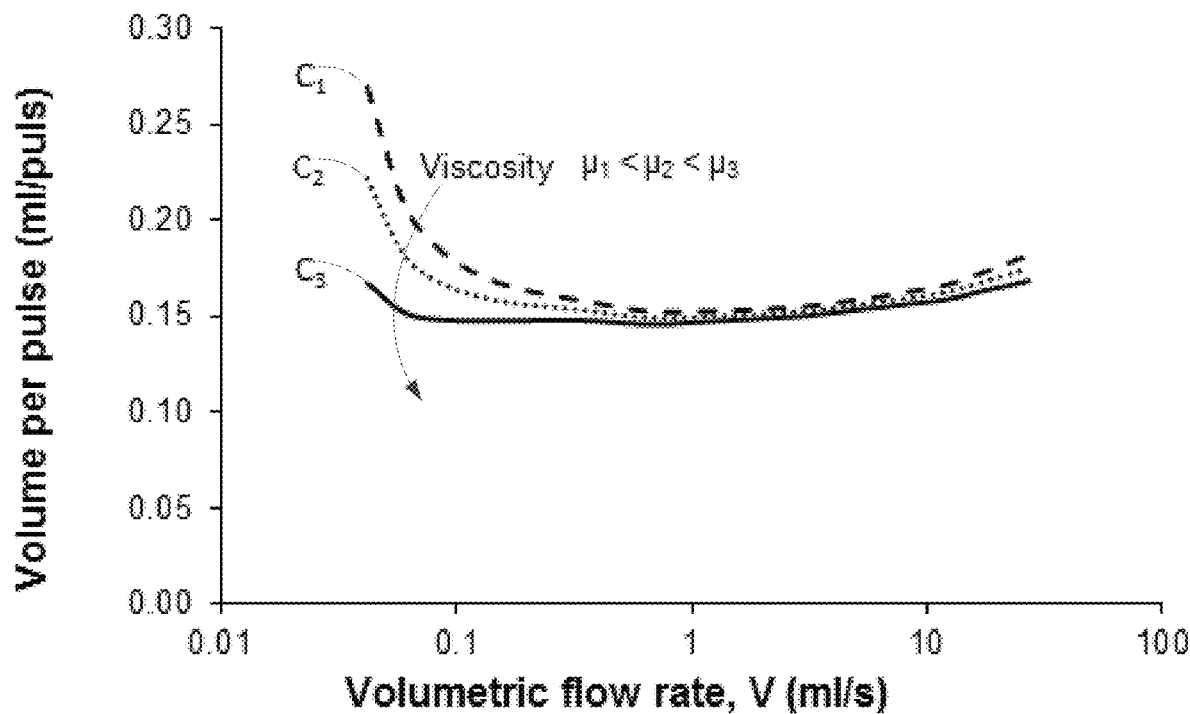
FIG. 5A is a plot illustrating a correlation between volume per pulse and volumetric flow rate for various viscosities according to a non-limiting illustrative embodiment.

Typically, the calibration data for a flow meter (e.g., volume per pulse) is stored in memory as a single nominal value. However, appreciably, the calibration parameter may not stay a constant for different flow rates and/or for different viscosities of products. As illustrated in FIG. 5A, the calibration curves $C_1$, $C_2$, $C_3$ for the same oval gear meter, but correspond to different products having viscosities $\mu_1$, $\mu_2$ and $\mu_3$, whereby, $\mu_1<\mu_2<\mu_3$. As seen therefrom, values of volume per pulse deviate significantly from a nominal constant value at low volumetric flow rates. The deviations may be most significant for products having low viscosity (e.g., viscosity $\mu_1$).

Figure 5B:
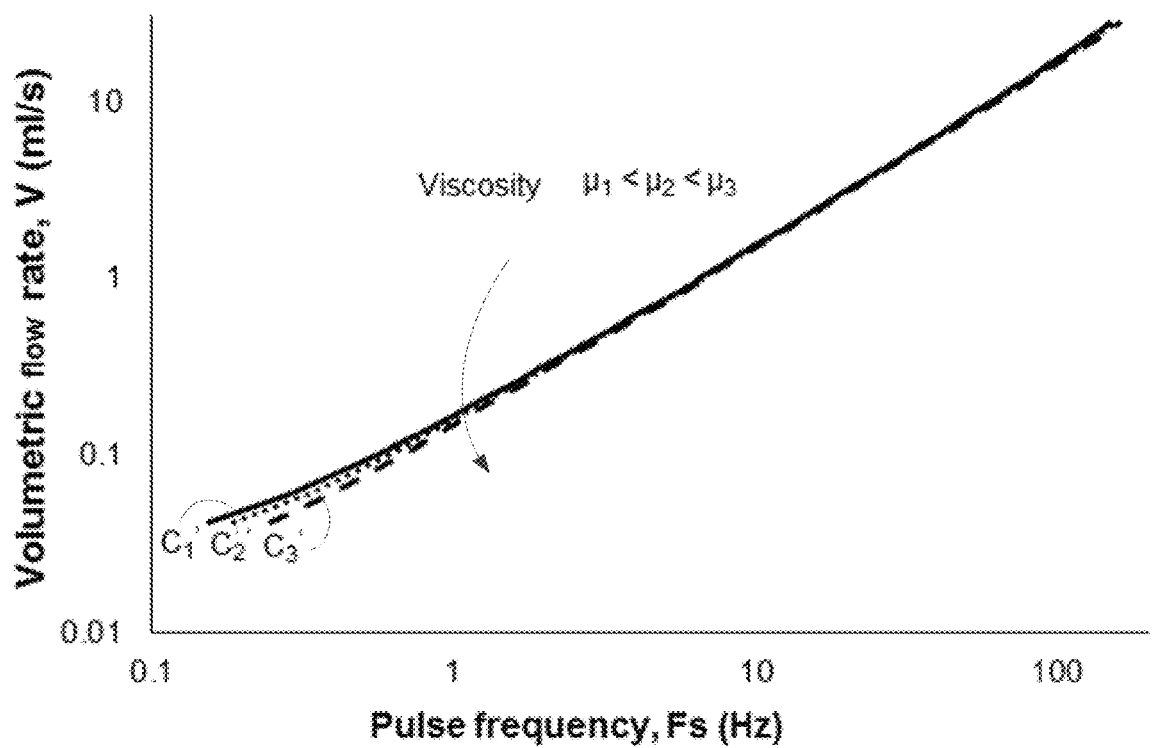
FIG. 5B is a plot illustrating a correlation between pulse frequency and volumetric flow rate for various viscosities according to a non-limiting illustrative embodiment.
Figure 5C:
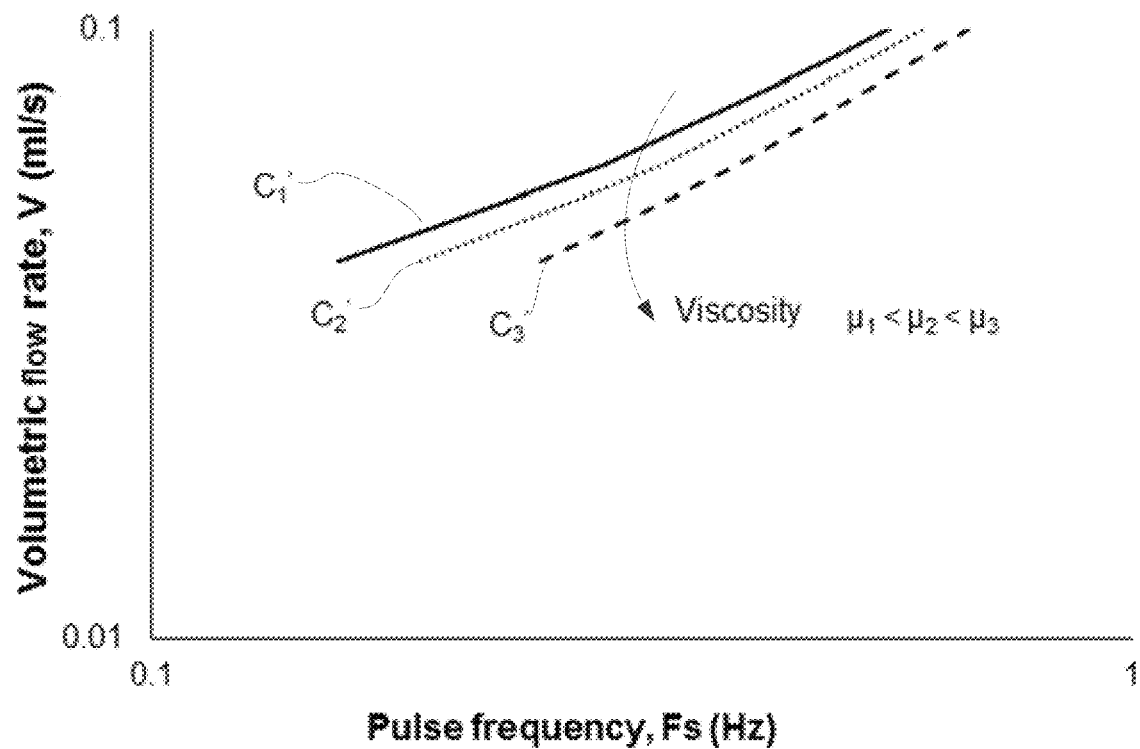
FIG. 5C is a resealed plot of pulse frequency and volumetric flow rate shown in FIG. 5B.

In certain embodiments, the fluid flow meter 100 can be calibrated by supplying a known quantity of fluid therethrough, and determining the pulse frequency $F_s$ for a known quantity (volume or volumetric flow rate) of fluid. Such methods can be referred to herein as "factory calibration." For instance, referring now to FIG. 5B, an example calibration graph is illustrated that shows the relation between the pulse frequency $F_s$ and volumetric flow rate V for an example fluid flow meter 100. As mentioned previously, this graph can be generated by supplying a known volumetric flow rate of fluid and determining the pulse frequency $F_s$. FIG. 5C is a rescaled graph of FIG. 5B, illustrating the calibration curves at low volumetric flow rates. At high volume flow rates, the relationship between the volumetric flow rate and the pulse frequency is generally linear. As seen from FIGS. 5B and 5C, calibration curves $C_1'$, $C_2'$, $C_3'$, each corresponding to products with viscosities, $\mu_1$, $\mu_2$ and $\mu_3$, respectively, whereby, $\mu_1<\mu_2<\mu_3$ have nonlinearities for low volumetric flow rates (e.g., less than 1 ml/s). The calibration curve $C_1'$ for a product with the lowest viscosity a, has the largest nonlinearity. As described previously, at low volumetric flow rates, an amount of product can flow through gaps around the oval gears of the flow meter without rotating the oval gears. At this point, the oval gears 108 do not rotate, as a result of which the frequency $F_s$ is zero. At some non-zero value of volumetric flow rate, as fluid begins to move the oval gears, and pulses are generated by the controller 141 at a non-zero pulse frequency. In the illustrated example, the correlation between frequency and volumetric flow rate is non-linear, whereas other mathematical relationships between frequency and volumetric flow can be contemplated.

While the illustrated example in FIGS. 5B and 5C provides an example calibration that relates frequency to volumetric flow rate, other similar calibrations can be stored in the controller 141. For instance, factory calibration can include volume of flow per pulse (e.g., milliliters/pulse) correlated to known volumetric flow rate (e.g., in milliliters/second) as shown in FIG. 5A. Thus, according to an example, by counting the number of pulses produced by the fluid flow meter 100, the volumetric flow rate (milliliters/second) can be determined based on the following equation:

$$V = \frac{v(V, \mu) \times N}{t} \quad (4)$$

In the above equation, the symbol v represents a pulse rate (milliliters/pulse), N is a number of pulses received during time t. As can be seen from FIG. 5A, the pulse rate $v(V, \mu)$ is a non-monotonous function of the volumetric flow rate V and viscosity $\mu$. For a product with a known viscosity $\mu_x$, the volumetric flow rate can be found, according to some embodiments, based on a set of iterative calculations using the following equation:

$$V_{n+1} = \frac{v_n(V_n, \mu_x) \times N}{t} \quad (5)$$

In the above equation, the symbol "n" represents an iteration number. According to illustrative embodiments, the iteration can start (e.g., with n=0), by assigning an average pulse rate for the flow meter (e.g., a nominal pulse rate) as $v_0$ and calculating a value of $V_1$ from equation (5) above. The value of $V_1$ can then be used to determine $v_1(V_1, \mu_x)$ from calibration (e.g., using FIG. 5A) for known viscosity $\mu_x$. Calculations using equation (5) and calibration (FIG. 5A) can be continued until an absolute value of pulse rate deviation is less than a desired accuracy "$\Delta$", as follows:

$$\left| \frac{v_{n+1} - v_n}{v_{n+1}} \right| < \Delta \quad (6)$$

In some cases, the desired accuracy can be about 1%. In such cases, the desired value of accuracy can be achieved after a few iterations. In advantageous embodiments, the desired value of accuracy can be achieved after performing the above steps for about 5 or about 10 iterations (e.g., 7 iterations).

Figure 5D:
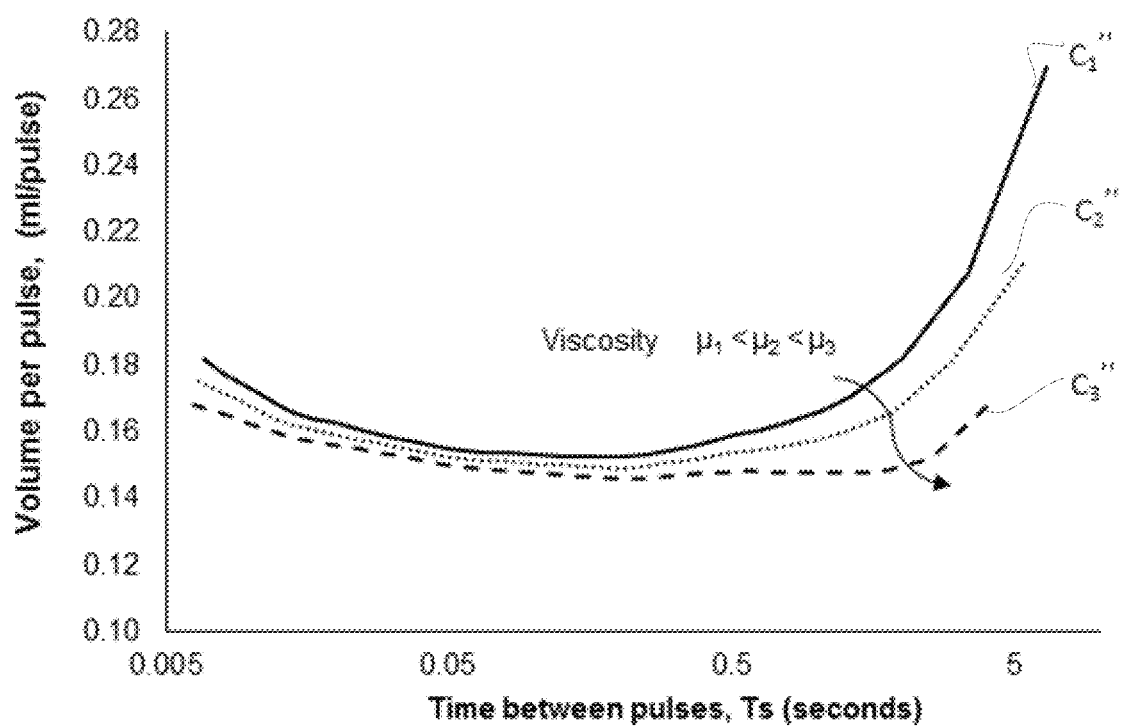
FIG. 5D is a plot illustrating the relationship between total (cumulative) volume of product flowing through the flow meter and time between pulses according to a non-limiting illustrative embodiment.

With reference to FIG. 5D, in some embodiments the total volume flowing through the flow meter can be calculated from calibration curves $C_1''$, $C_2''$, $C_3''$, each corresponding to products with viscosities, $\mu_1$, $\mu_2$ and $\mu_3$, respectively, whereby, $\mu_1 < \mu_2 < \mu_3$. Such embodiments may be beneficial for use with variable flow or pulsed flow pumps where it may be more desirable to know the total volume of a product to be pumped, and/or the rate at which a product is being pumped may not be constant over time. In such cases, the total volume can be calculated as sum of volumes per each individual pulse. As seen in FIG. 5D, each calibration curve $C_1''$, $C_2''$, $C_3''$ can be saved in memory as a look-up table or an equation. The controller can, in such embodiments, measure the time between consecutively generated pulses and add the corresponding volume of flow that passed through the oval gears to obtain the total volume of product flowing through the fluid flow meter in that interval. The controller may optionally calculate the volumetric flow rate for instance, as a time derivative of the total volume of product.

Factory calibration of existing fluid flow meters may not be corrected to account for any changes in viscosity of the fluid. While this may not affect fluids that have a generally constant viscosity over a wide range of operating conditions, if fluids whose viscosity changes with changes in operating conditions (e.g., temperature, duration over which the product is stored), typical factory calibration may have errors associated therewith. In use, for instance, the fluid flow meter 100 may supply products (e.g., chemicals such as sanitizers) at precise quantities (e.g., at specific value or range of volumetric flow rate) suitable for an end application. If the viscosity of the product varies due to operating conditions (e.g., temperature or time), for instance, due to product deterioration, the quantity of product metered using the fluid flow meter 100, for instance, may not be accurate, or may be less desirable for the end application at hand (e.g., because of under-feeding or over-feeding).

Advantageously, some embodiments of the present disclosure provide a fluid flow meter 100 whereby the factory calibration is adjusted to account for changes in viscosity. Multiple calibration curves for wide range of flow and different product viscosity can be saved in memory (e.g., as illustrated in FIGS. 5B-5D). During operation, the flow meter may receive additional data indicative of a product's viscosity, thereby allowing the controller to select the appropriate calibration curve to determine momentarily volumetric flow rate or volume per pulse. As is known, a fluid's viscosity generally offers resistance to its flow. For instance, if the fluid were a product (e.g., chemical products) flowing through a feed tube, and if the product viscosity were to increase (e.g., due to operating conditions or over time as the product deteriorates), large pressure changes are associated with the increase in viscosity. In such examples, the pressure changes can be characterized by a pressure drop over a length of the feed tube. Accordingly, fluids having higher viscosity may generate a higher pressure drop, thereby requiring higher pump power to push the fluid through the feed tube relative to fluids of lower viscosity. Conversely, if the pump were to not provide adequate pressure to account for the increased pressured drop (and/or viscosity), the flow rate of fluid through the feed tube may be lower than a desired (e.g., predetermined) value. Accordingly, in some examples, the fluid flow meter 100 can be configured to compensate for the changes in fluid's viscosity. Advantageously, fluid flow meter 100 according to some embodiments may sense the flow resistance created by changing viscosity (e.g., increased pressure drop associated with a viscosity increase), and retrieve calibration data that is suitable for the detected change in viscosity (and/or pressure drop).

Figure 5E:
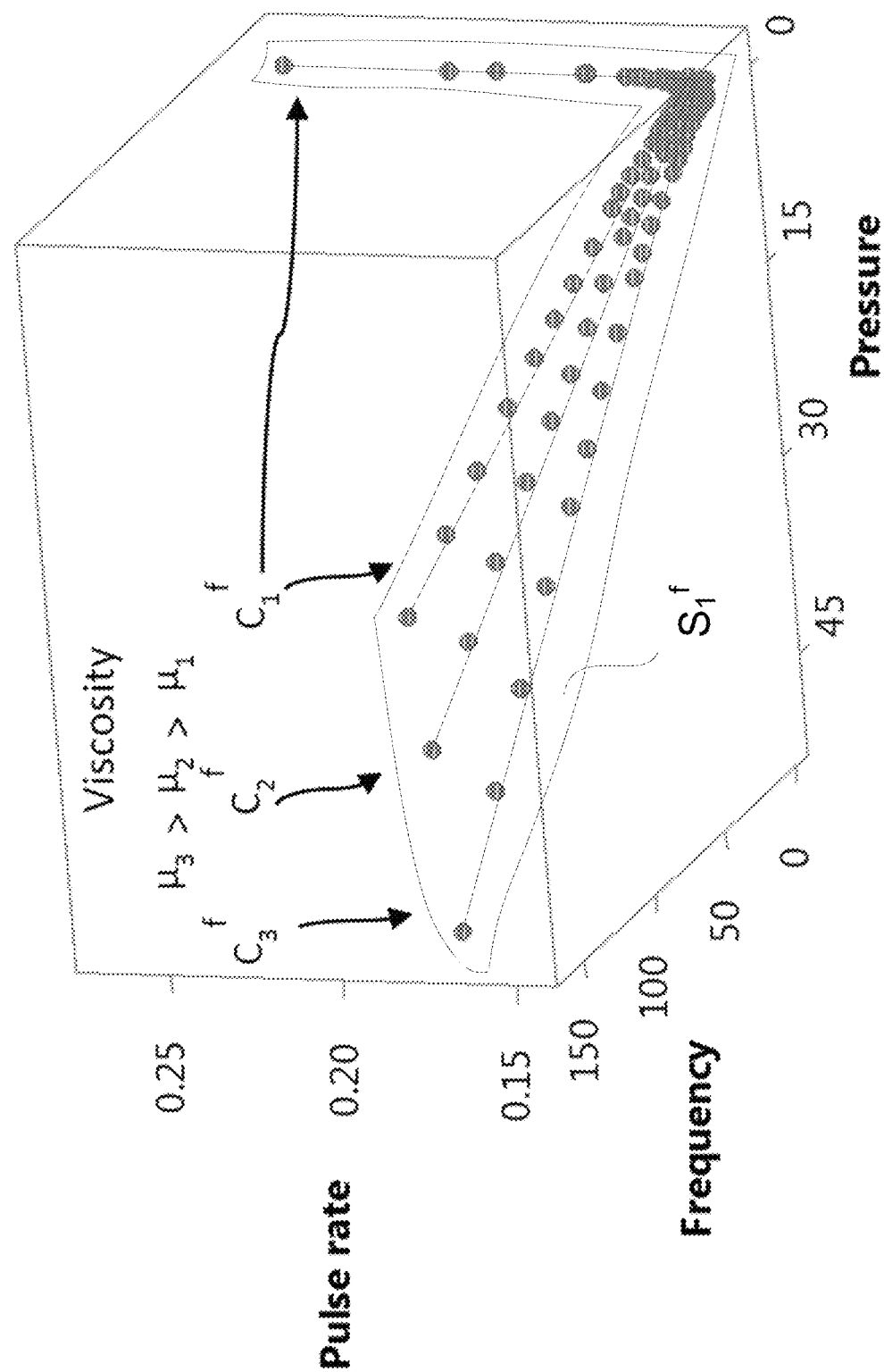
FIG. 5E is a 3D scatter plot depicting the calibration relationship between pressure, volume per pulse (pulse rate), and pulse frequency stored in the look-up table according to a non-limiting illustrative embodiment.
Figure 5F:
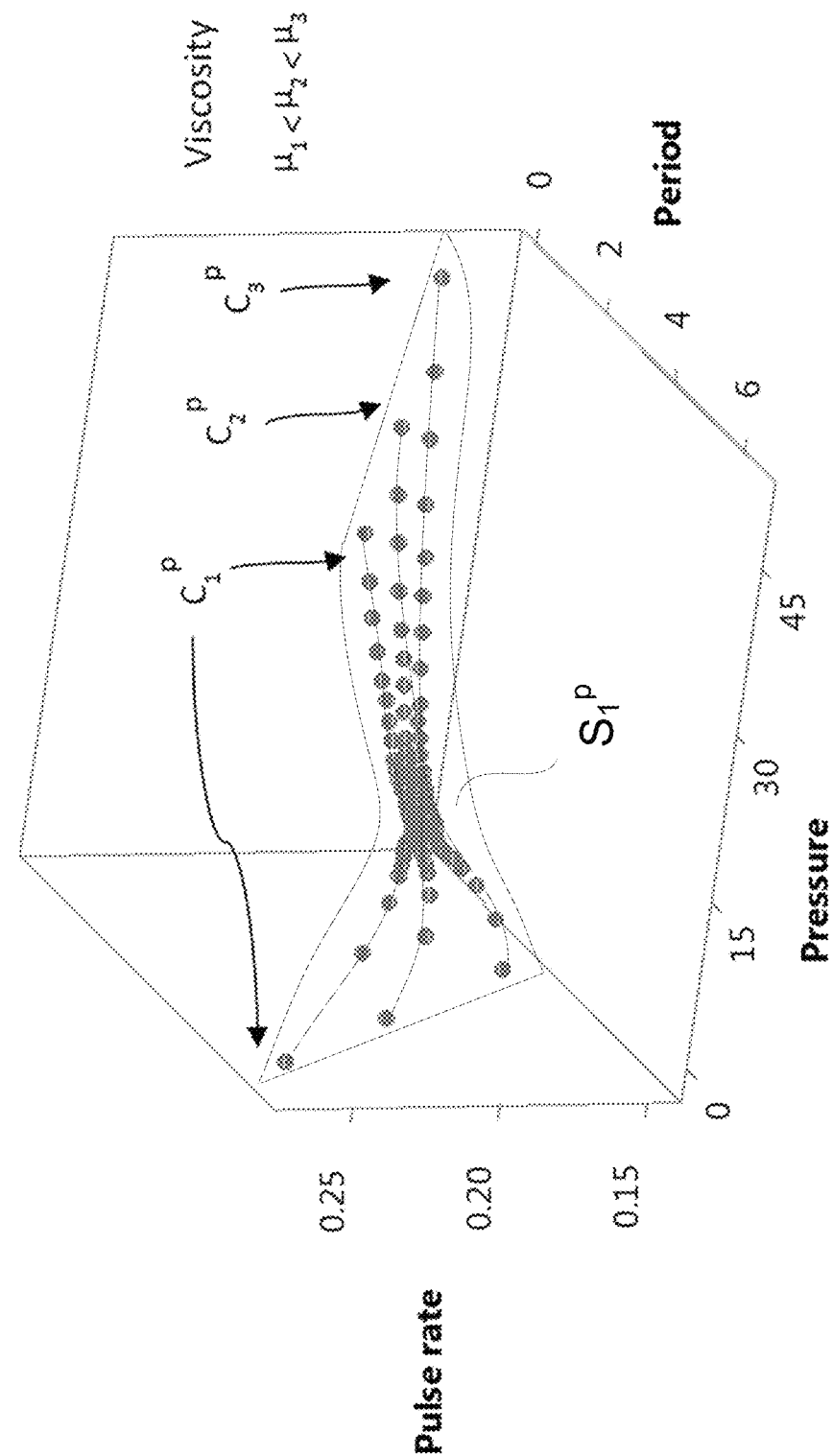
FIG. 5F is a 3D scatter plot depicting the calibration relationship between pressure, volume per pulse (pulse rate), and time period between pulses stored in the look-up table according to a non-limiting illustrative embodiment.
Figure 5G:
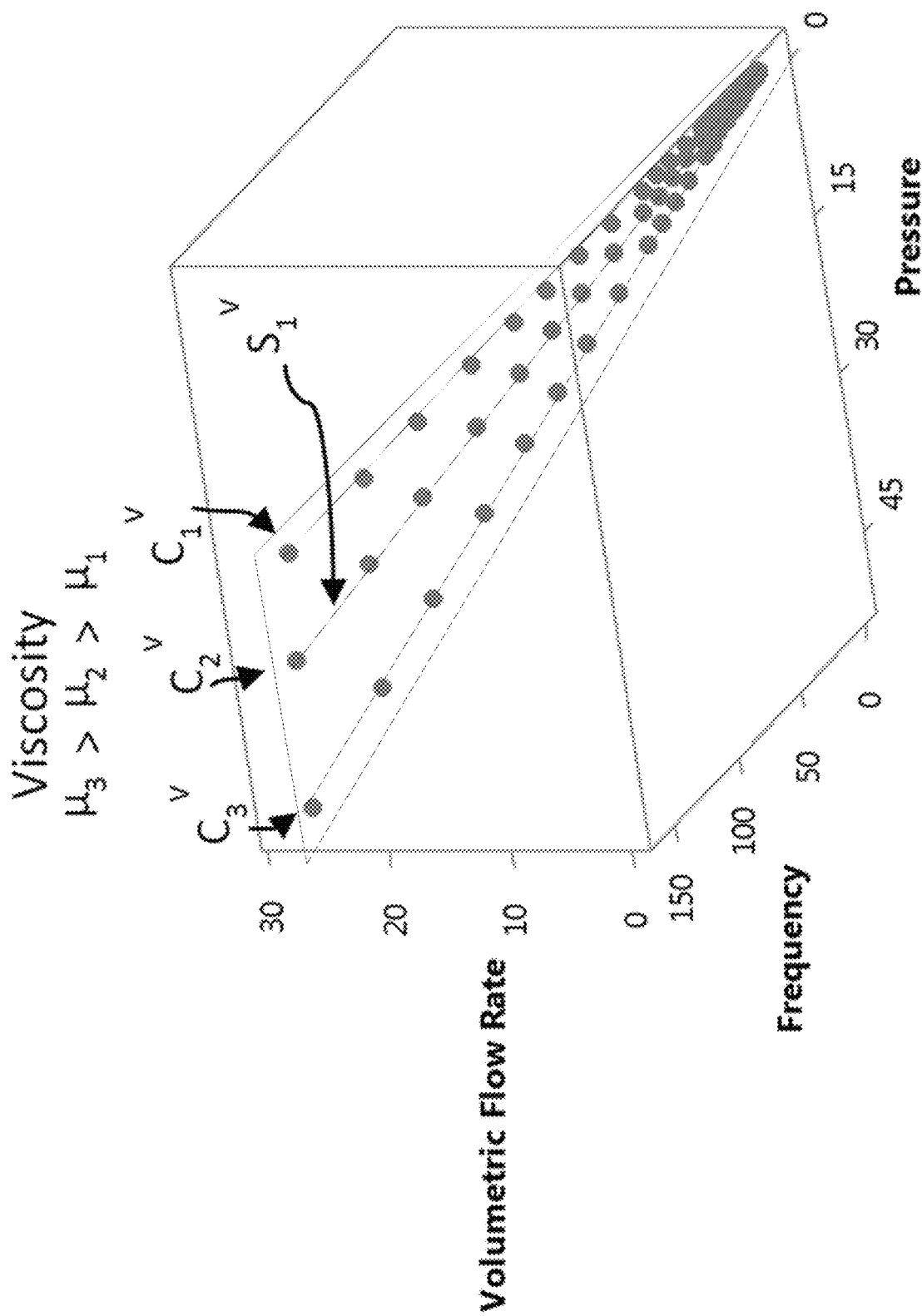
FIG. 5G is a 3D scatter plot depicting the calibration relationship between pressure, volumetric flow rate, and pulse frequency stored in the look-up table according to a non-limiting illustrative embodiment.

As is apparent to one skilled in the art, volumetric flow rate, viscosity and pressure drop of a fluid can be determined for a variety of fluids using known relations such as Hagen-Poiseuille equation. For instance, if the volumetric flow rate and pressure drop are known and/or measurable (e.g., using an orifice plate, pressure sensors, and the like), viscosity of the fluid can be inferred from such known relations and/or models. Further, calibration data can be generated that correlates known volumetric flow rate to frequency, $F_s$. Accordingly, in some such examples, correlations can be displayed graphically in the form of three-dimensional surface plots, examples of which are shown in FIGS. 5E-5G. As seen from FIG. 5G, frequency, volume flow rate and pressure drop represent three axes of the three-dimensional plot, and the surface "$S_1^V$" represents the relationship between the variables displayed graphically in the three axes. The surface "$S_1^V$" consist of multiple calibration lines which correspond to different product viscosities. Calibration line $C_1^V$, $C_2^V$, $C_3^V$ shown as examples. Calibration steps for measuring $C_1^V$, $C_2^V$, $C_3^V$ are same as for measuring $C_1'$, $C_2'$, $C_3'$ shown on FIG. 5B with additional measuring of pressure drop for each data point displayed in FIG. 5G. Similar surfaces, "$S_1^f$" and "$S_1^P$" are illustrated in FIGS. 5E and 5F respectively, corresponding to calibration curves ($C_1^f$, $C_2^f$, $C_3^f$) and ($C_1^P$, $C_2^P$, $C_3^P$) respectively. It should be noted that the surfaces "$S_1^V$," "$S_1^P$," and "$S_1^f$" are illustrative examples, and does not represent an exact or precise relationship between the variables plotted in the surface plot.

With continued reference to FIG. 5G, as is apparent, once calibration is performed and the correlations between pressure drop, frequency and volumetric flow rate are established for different viscosities. For instance, if the pressure drop and the flow frequency are known (and/or measurable), the volumetric flow rate and product viscosity can be determined using the known relationship "$S_1^V$". Accordingly, in some example embodiments, the controller 141 can determine an unknown volumetric flow rate by receiving fluid pressure measured from a pressure sensor (e.g., sensor 200 seen in FIG. 1) and frequency $F_s$ (e.g., in response to the fluid flow). Advantageously, the accuracy of measurement can be significantly improved because the disclosed systems and methods allow to compensate nonlinearity of flow meter response and deviations caused by viscosity.

Calibration data such as correlations of fluid pressure, volumetric flow rate (or volume per pulse) and frequency (or time between pulses) generated in accordance with FIGS. 5A-5G can be stored in the data storage 150. In one example, the data storage 150 stores factory calibration data in the form of a lookup table. Alternatively, the data storage 150 can use any array indexing operation to store factory calibration data. In such cases, during use, the controller 141 can retrieve from the data storage 150, the volumetric flow rate correlated with a particular value of fluid pressure and frequency.

In certain embodiments, the pressure drop may vary during gear rotation. Accordingly, the pressure drop can be measured over a period of time between two pulses, or alternatively, over several pulses. An average pressure drop over such a period can be used during calibration and/or during use of the fluid flow meter to measure various quantities such as volumetric flow rate, total volume and optionally viscosity. Such embodiments may ensure better accuracy of measurements particularly in embodiments where there may be large variability in pressure drop over the course of the gear rotation.

Referring again to FIG. 5C, factory calibration data can be generated for different known viscosities. For instance, different fluids whose viscosity is known can be supplied to the fluid flow meter 100 to determine their viscosity. Alternatively, a single fluid whose viscosity varies based on operating conditions (e.g., temperature, time) can be supplied at different operating conditions so as to generate calibration data for different values of viscosity. For instance, in the three-dimensional graphical representation of calibration data shown in FIG. 5F, lines $C_1^V$, $C_2^V$, $C_3^V$ represent correlations of pressure drop, volumetric flow rate and frequency for different values of viscosity $\mu_1$, $\mu_2$ and $\mu_3$. It should be understood that the values of viscosity illustrated in FIG. 5F are unique and distinct from each other ($\mu_1 \neq \mu_2 \neq \mu_3$).

Referring back to FIG. 5B, as is apparent from the foregoing description, the correlations shown in FIG. 5B are two-dimensional representations of the correlations shown in FIG. 5F. Accordingly, FIG. 5B can have corresponding curves ($C_1'$, $C_2'$ and $C_3'$) shown as $C_1^V$, $C_2^V$, $C_3^V$ on surfaces $S_1^V$ in FIG. 5F. Accordingly, if any two of the following variables are known, the remaining two unknown variables can be determined using the factory calibration data that are graphically represented in FIGS. 5B and 5F. For instance, if the pressure drop and frequency are known (and/or measurable), volumetric flow rate and viscosity may be determined (e.g., by the controller 141) from the factory calibration data (e.g., stored in the data storage 150). Such embodiments can be useful for feeding an appropriate amount of fluid using the flow meter when the viscosity of the fluid is unknown and/or variable based on the operating conditions. For measuring variable flow or flow from pulsing pumps, as described previously with respect to FIG. 5D, the total volume can be calculated as sum of volumes per each individual pulse. In such cases, the calibration shown on FIGS. 5D and 5F can be used wherein, curves ($C_1''$, $C_2''$ and $C_3''$) shown in FIG. 5D are shown as corresponding $C_1^P$, $C_2^P$, $C_3^P$ on surfaces $S_1^P$ in FIG. 5F. In some such cases, as is appreciable from FIGS. 5D and 5F, the data storage includes calibration data (e.g., in the form of a look-up table) that correlates fluid pressure, volume per pulse (pulse rate) and time between pulses (or period) for different product viscosities. By knowing two parameters (e.g., by way of measurements, for instance, pressure drop and frequency as shown in FIG. 5E, or pressure drop and time between pulses as shown in FIG. 5F), the volume per pulse, and optionally, the viscosity of the product may be found.

In some embodiments, the pressure drop across the flow chamber 106 can be measured by using a pressure sensor 200 fluidly connected in parallel to the flow chamber 106. The pressure sensor 200 can be in communication with (e.g., directly or indirectly electrically coupled to) the controller 141 and the data storage 150. The pressure sensor 200 can measure a differential pressure across the flow chamber 106. As is apparent, in such cases, the differential pressure corresponds to the difference in fluid pressure at the fluid inlet 104 and the fluid outlet 105. The pressure sensor 200 can be a pressure transducer that provides a digital pressure output corresponding to the differential pressure. Alternatively, other pressure measuring means, such as an orifice restrictor are contemplated within the scope of the present disclosure. In such cases, fluid couplings (e.g., tapped holes, tubes with barbed fittings and the like) can be connected to fluid inlet 104, fluid outlet 105 and pressure sensor 200. The pressure sensor 200 can be configured to measure pressure instantaneously and/or over a predefined time interval. In such cases, the controller 141 can determine an average pressure based on the measured instantaneous pressure (or that measured over a time interval). In such cases, the average pressure can be considered as a representative value of fluid pressure associated with a given volumetric flow rate and a given viscosity. Accordingly, frequency, viscosity and volumetric flow rate stored in the data can be correlated to the average value of pressure to account for flow non-uniformities.

In use, when a fluid of unknown viscosity passes through the fluid flow meter 100, based on the frequency and the measured pressure, the volume and/or viscosity can be determined from the corrected calibration that accounts for viscosity changes. First, the fluid flow meter 100 can be calibrated according to the calibration method 600 shown in FIG. 6A. A fluid flow meter 100 according to any of the embodiments disclosed herein can be calibrated according to this method. At step 602, a known volumetric flow rate of fluid is supplied through the flow chamber 106. As the fluid passes therethrough, as a result of positive displacement, the first gear and the second gear may rotate. Optionally, the fluid flow meter 100 can determine one or more valid rotational states for the first gear and the second gear to eliminate jitter, backflow and other such flow non-uniformities. In such cases, the fluid flow meter 100 may generate a pulse when the rotation of the oval gears 108 corresponds to rotation from a valid rotational state to another valid rotational state. Accordingly, at step 604, the controller 141 can optionally call a pulse generation sub-process, an example of which is illustrated in FIG. 4C. At step 606, pressure drop across the flow chamber 106 can be measured using the pressure sensor 200. In certain embodiments, the pressure drop may vary during gear rotation. Accordingly, the pressure drop can be measured over a period of time between two pulses, or alternatively, over several pulses. An average pressure drop over such a period can be used. At step 608, pulse frequency corresponding to the generated pulses can be determined by the controller 141. At step 610, the controller 141 can generate a correlation between pulse frequency, fluid pressure and known volumetric flow rate for various volumetric flow rates and store the generated correlation (e.g., desired number of data points as determined at step 612) in the data storage 150.

Figure 6A:
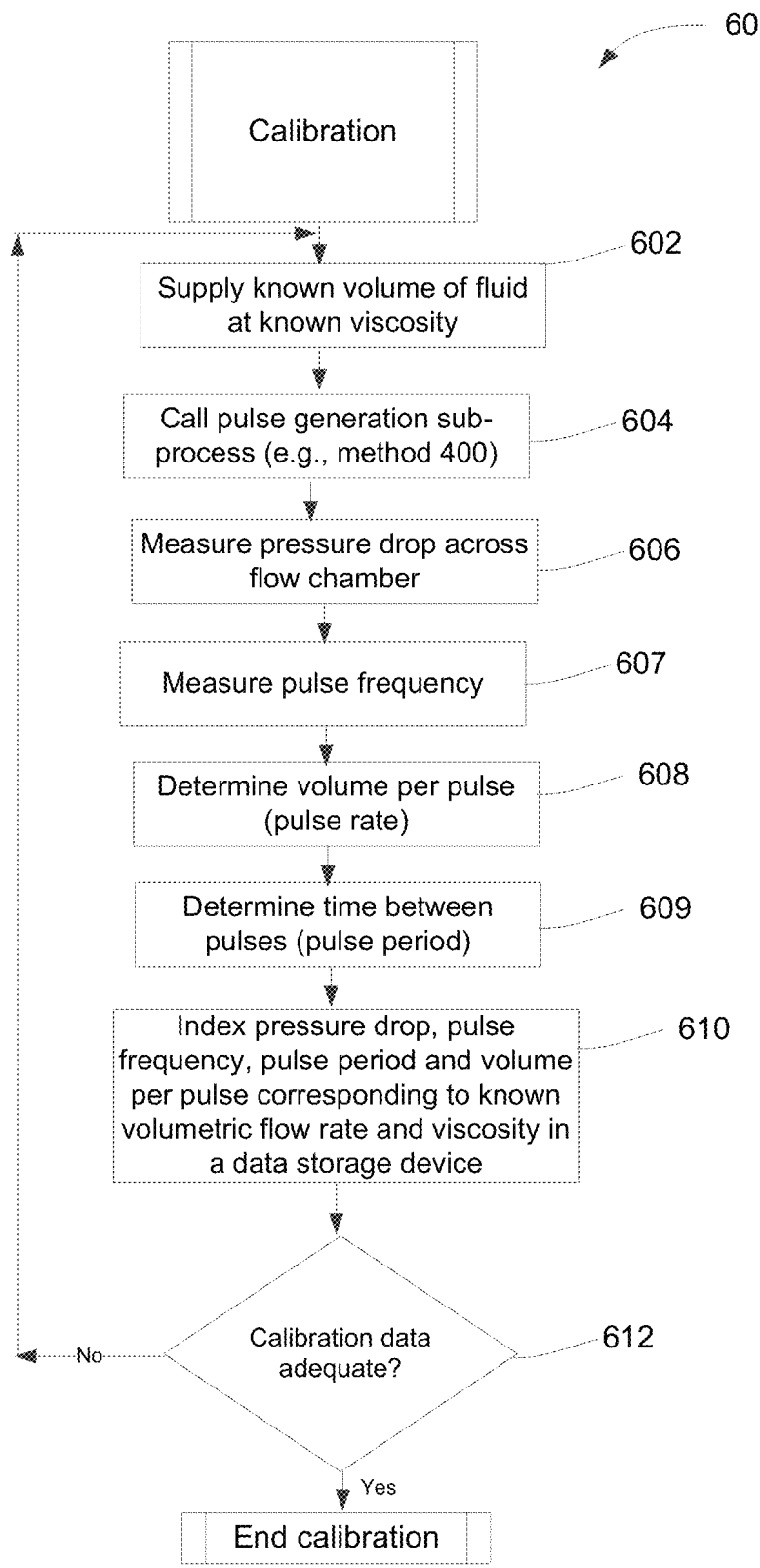
FIG. 6A is a schematic illustrating a method of calibrating the fluid flow meter of FIG. 1 according to a non-limiting illustrative embodiment.
Figure 6B:
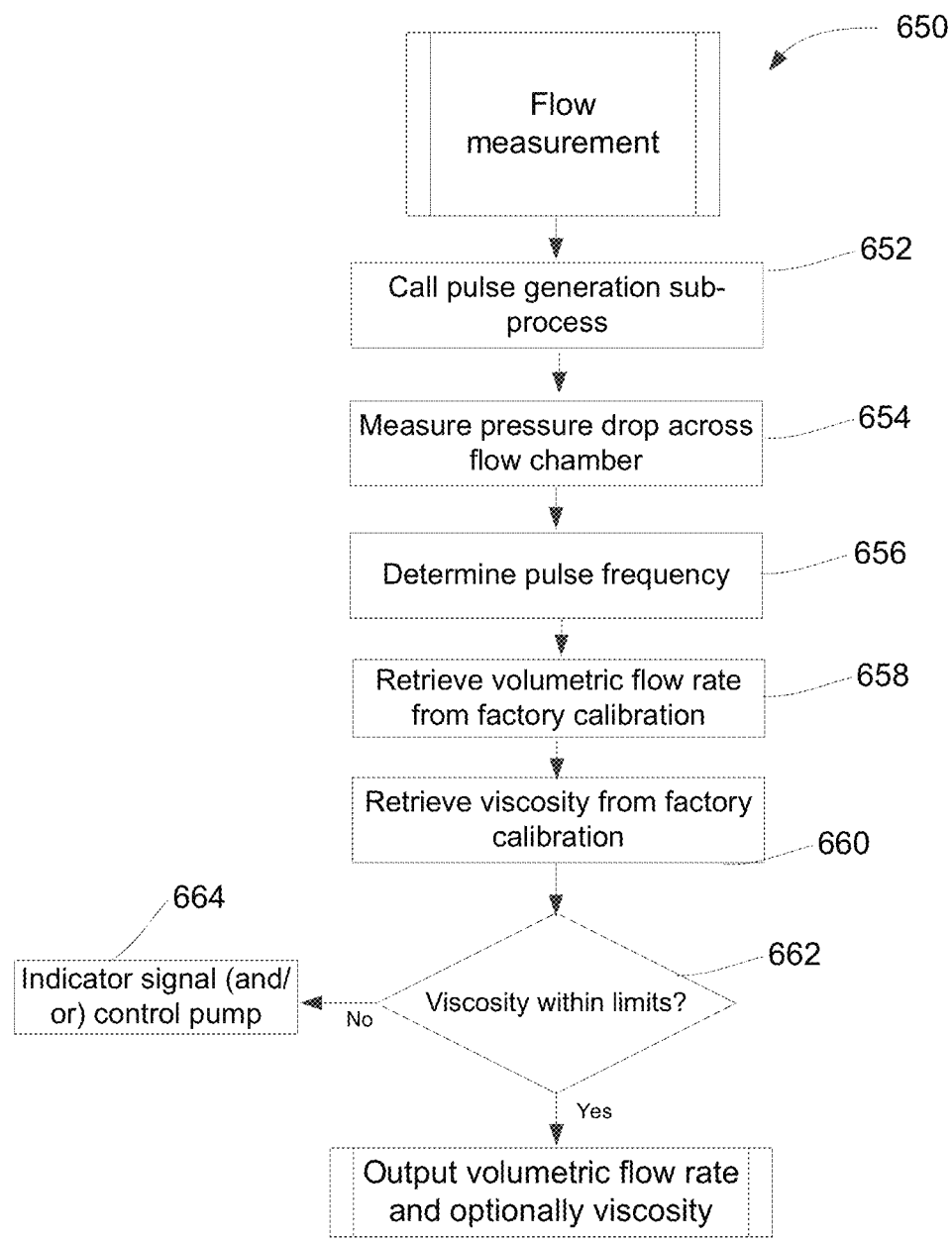
FIG. 6B is a schematic illustrating a method of using the fluid flow meter of FIG. 1 to determine volumetric flow rate and viscosity according to a non-limiting illustrative embodiment.

FIG. 6B illustrates a method 650 of measuring volumetric flow rate of flow meter that has been previously calibrated (e.g., using the method illustrated in FIG. 6A). At step 652, as the fluid flows through the fluid flow meter 100 at an unknown volumetric flow rate, the controller 141 can generate pulses. Optionally, the pulse generation can be performed in accordance with the pulse generation sub-process illustrated in FIG. 4C. At step 654, fluid pressure corresponding to the unknown volumetric flow rate can be measured (e.g., using the pressure sensor 200). At step 656, pulse frequency can be determined. At step 658, the controller 141 can retrieve (e.g., from the data storage 150) calibration data. For instance, if the calibration data are stored in the form of a lookup table, the controller 141 can retrieve the volumetric flow rate correlated with the measured value of fluid pressure (e.g., measured at step 654) and the determined value of pulse frequency (e.g., determined at step 656) from the lookup table.

As is apparent to one skilled in the art, the method of FIG. 6A can be performed for fluids of different viscosities, and the correlations can be stored for each of the viscosities for which calibration is performed. In such cases, correlations between pulse frequency, fluid pressure and volumetric flow rate can be stored in the data storage 150 (e.g., in the form lookup table) for different known viscosities. In use, if the viscosity of the fluid flowing through the flow meter is unknown, returning to FIG. 6B, optionally, at step 660 the viscosity can be retrieved from the calibration data stored in the data storage 150. Further, optionally, at step 662, if the viscosity determined from the calibration data at step 660 exceeds predetermined limits, at step 664 an indicator signal can be generated and/or pump controls can be activated (e.g., to shut off pump, to increase pressure to supply more fluid, and the like). Such embodiments can facilitate warning an operator that the viscosity of the fluid (e.g., supplied in a process feed) has exceeded acceptable limits, which may signal product deterioration. If the viscosity is within acceptable limits, at step 664, volumetric flow rate and optionally, fluid viscosity can be provided as outputs (e.g., as a numeric value on a display on the fluid flow meter 100). It should be noted while oval gear 108 flow meters are used as an example, systems and methods disclosed herein can be useful for calibrating and/or measuring viscosity corrected volumetric flow rate for any positive displacement flow meter.

Figure 6C:
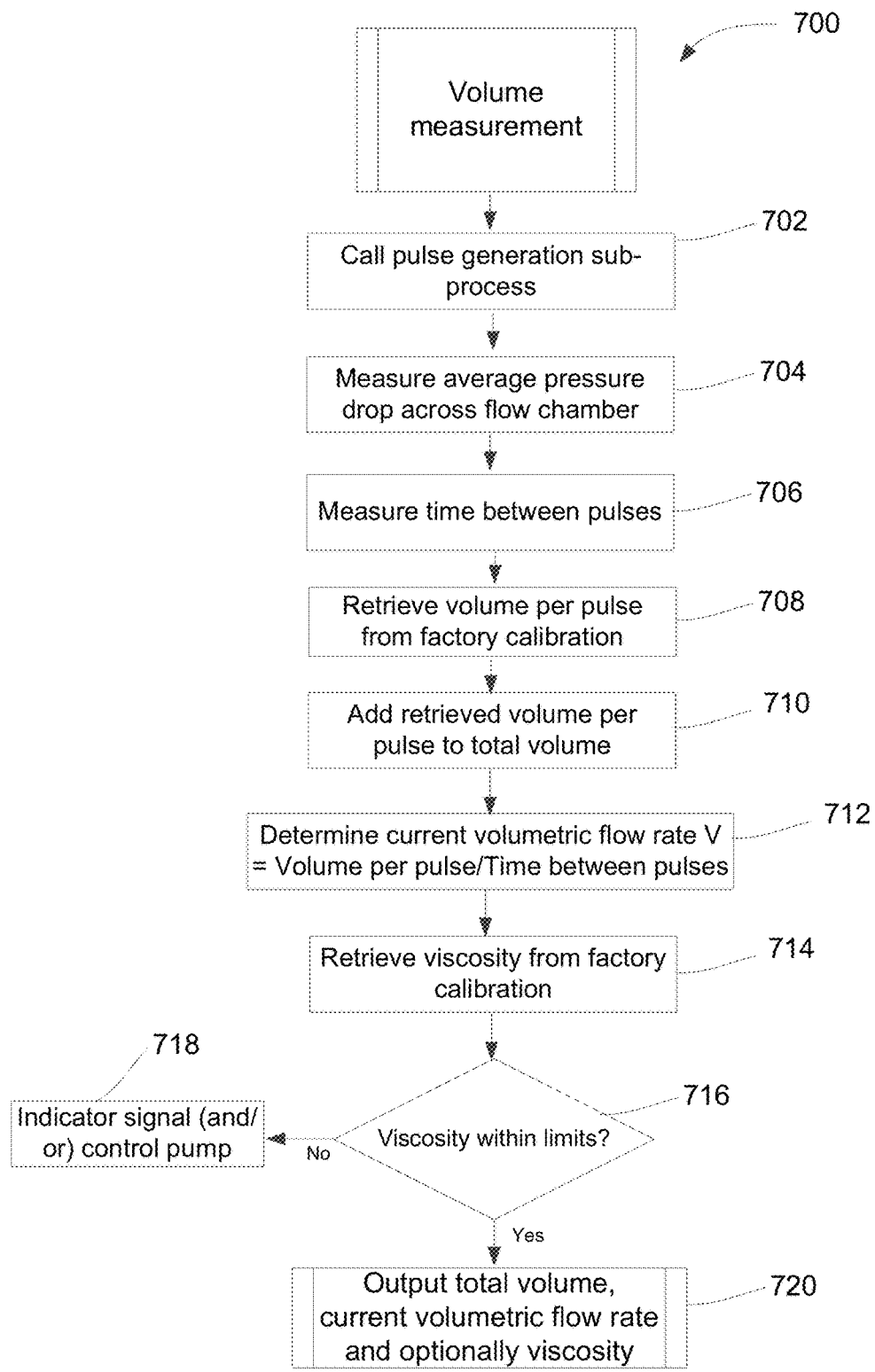
FIG. 6C is a schematic illustrating a method of using the fluid flow meter of FIG. 1 to determine total volume, current volumetric flow rate and viscosity according to a non-limiting illustrative embodiment.

FIG. 6C illustrates a method 700 of measuring total volume of a product flowing through a flow meter that has been previously calibrated (e.g., using the method illustrated in FIGS. 6A-6B). At step 702, as the fluid flows through the fluid flow meter 100 at an unknown volumetric flow rate, the controller 141 can generate pulses. Optionally, the pulse generation can be performed in accordance with the pulse generation sub-process illustrated in FIG. 4C. At step 704, fluid pressure corresponding to the unknown volumetric flow rate can be measured (e.g., using the pressure sensor 200). In some embodiments, the pressure drop may vary during gear rotation. Accordingly, the pressure drop can be measured over a period of time between two pulses, or alternatively, over several pulses. An average pressure drop over such a period can be used.

At step 706, a time between pulses (pulse period) can be determined. At step 708, the controller 141 can retrieve (e.g., from the data storage 150) calibration data. For instance, if the calibration data are stored in the form of a lookup table, the controller 141 can retrieve the volume per pulse correlated with the measured value of fluid pressure (e.g., measured at step 704) and the determined value of pulse period (e.g., determined at step 706) from the lookup table. At step 710, the retrieved volume per pulse can be added to a volume counter to determine a total volume of a fluid flowing through the fluid flow meter. This process may be repeated for a desired interval of time, over which the total volume is to be determined. At step 712, the current volumetric flow rate may be determined as the ratio of the current volume per pulse retrieved (e.g., at step 708), and the determined time between pulses (e.g., at step 706).

As is apparent to one skilled in the art, the method of FIG. 6A can be performed for fluids of different viscosities, and the correlations can be stored for each of the viscosities for which calibration is performed. In such cases, correlations between pulse frequency, fluid pressure and volumetric flow rate can be stored in the data storage 150 (e.g., in the form lookup table) for different known viscosities. In use, if the viscosity of the fluid flowing through the flow meter is unknown, returning to FIG. 6C, optionally, at step 714 the viscosity can be retrieved from the calibration data stored in the data storage 150. Further, optionally, at step 716, if the viscosity determined from the calibration data at step 714 exceeds predetermined limits, at step 718 an indicator signal can be generated and/or pump controls can be activated (e.g., to shut off pump, to increase pressure to supply more fluid, and the like). Such embodiments can facilitate warning an operator that the viscosity of the fluid (e.g., supplied in a process feed) has exceeded acceptable limits, which may signal product deterioration. If the viscosity is within acceptable limits, at step 720, total volume, current volumetric flow rate and optionally, fluid viscosity can be provided as outputs (e.g., as a numeric value on a display on the fluid flow meter 100). It should be noted while oval gear 108 flow meters are used as an example, systems and methods disclosed herein can be useful for calibrating and/or measuring viscosity corrected volumetric flow rate for any positive displacement flow meter.

Certain functionalities of fluid flow meters described herein can be combined with the functionalities described in the commonly-assigned applications U.S. Ser. No. 15/658,435, titled "Fluid Flow Meter with Linearization," filed on Jul. 25, 2017, and U.S. Ser. No. 15/658,437, titled "Fluid Flow Meter with Normalized Output," filed on Jul. 25, 2017, the entire contents of each of which is hereby incorporated by reference.

Embodiments described herein provide one or more advantages. Fluid flow meters according to embodiments disclosed herein provide a viscosity corrected volumetric flow rate to ensure a correct volumetric flow rate of fluid is supplied to the end application. Further, embodiments in accordance with the present disclosure may permit signaling to the user any problems with the product feed (e.g., product deterioration).

Various examples have been described. These and other examples are within the scope of the following numbered embodiments.

The invention claimed is:

1. A fluid flow meter, comprising:
  a flow chamber;
  a first gear intermeshing with a second gear, the first gear and the second gear being positioned within the flow chamber, the intermeshing of the first gear and the second gear permitting synchronous rotation of the first gear and the second gear in response to flow of a fluid through the flow chamber; and
  a controller being configured to generate pulses in response to the passage of fluid through the flow chamber and/or synchronous rotation of the first gear and the second gear, the controller having a data storage, the pulses having a pulse frequency associated therewith,
  the data storage being configured to store correlations of:
    a) fluid pressure, and
    b) volume per pulse or volumetric flow rate, and
    c) time period between pulses or pulse frequency,
  the controller being configured to determine the correlations by receiving a measured value of a fluid pressure from a pressure sensor and determining:
    a value of pulse frequency for a known volumetric flow rate of fluid, or
    a time period between pulses for a known volume per pulse,
  the controller being configured to determine an unknown volume per pulse or an unknown volumetric flow rate by:
    receiving fluid pressure and determining:
      time period between the generated pulses corresponding to the unknown volume per pulse or
      pulse frequency of the generated pulses corresponding to the unknown volumetric flow rate, and
    retrieving from the data storage:
      a volume per pulse correlated with the measured value of fluid pressure and the determined value of time period between pulses, or
      a volumetric flow rate correlated with the measured value of fluid pressure and the determined value of pulse frequency, and
  the controller being configured to determine an unknown viscosity of fluid flowing through the chamber by:
    generating correlations between pulse frequency, fluid pressure, and volumetric flow rates of fluids with different known viscosities flowing through the flow chamber, and
    determining an unknown viscosity of fluid flowing through the chamber based on the pulse frequency of the pulses generated from the fluid flowing through the chamber, the measured fluid pressure of the fluid of unknown viscosity, and the generated correlations stored in the data storage to determine the unknown viscosity.

2. The fluid flow meter of claim 1, wherein the data storage is configured to store correlations of fluid pressure, volumetric flow rate and pulse frequency for fluids of different viscosities.

3. The fluid flow meter of claim 1, wherein the fluid flow meter is a positive displacement flow meter.

4. The fluid flow meter of claim 3, wherein the fluid flow meter is an oval-gear meter.

5. The fluid flow meter of claim 1, wherein at least one of the first gear and the second gear have a detectable area for detecting a rotational position of the first gear and the second gear when the fluid passes through the flow chamber.

6. The fluid flow meter of claim 5, further comprising one or more non-contact sensors configured to sense the detectable area when the first gear and second gear are in the rotational position, the one or more non-contact sensors being further configured to generate a detection signal, and the detection signal being indicative of a position of the detectable area relative to the at least one non-contact sensor.

7. The fluid flow meter of claim 6, wherein the controller is configured to generate pulses when the detection signal is indicative of the first gear and the second gear rotating from a first valid rotational state to a second valid rotational state.

8. The fluid flow meter of claim 7, wherein the controller is configured to not generate pulses when the detection signal is indicative of the first gear and the second gear rotating from the first valid rotational state to an invalid rotational state.

9. The fluid flow meter of claim 1, wherein the data storage being configured to store correlations of pressure, volumetric flow rate and pulse frequency in the form of a lookup table.

10. The fluid flow meter of claim 9, wherein the correlations of pressure, volumetric flow rate and pulse frequency are non-linear.

11. The fluid flow meter of claim 1, wherein
  the flow meter comprises a fluid inlet and a fluid outlet; and
  the pressure sensor is configured to measure a differential pressure across the flow chamber, the differential pressure corresponding to the difference in fluid pressure at the fluid inlet and the fluid outlet.

12. The fluid flow meter of claim 1, wherein the fluid passing through the flow chamber has a viscosity that is unknown.

13. The fluid flow meter of claim 1, wherein the fluid passing through the flow chamber has a viscosity that is variable.

14. The fluid flow meter of claim 1, wherein the controller is configured to determine a total volume of fluid flowing through the fluid flow meter over a time interval by performing the following steps each time a pulse is generated:
  retrieving from the data storage, the volume per pulse correlated with the measured value of fluid pressure, and
  adding the retrieved volume per pulse to a total volume counter.

15. The fluid flow meter of claim 1, wherein the pressure sensor is configured to measure the pressure over a period of time corresponding to the time between two consecutive pulses.

16. The fluid flow meter of claim 1, wherein the pressure sensor is configured to measure the pressure over a period of time corresponding to several pulses.

17. The fluid flow meter of claim 16, wherein the controller is configured to determine an average value of pressure based on the measured pressure over several pulses, and retrieve correlations from the data storage based on the average value of pressure.

18. A method of measuring an unknown viscosity of a fluid, comprising:
providing a fluid flow meter, the fluid flow meter comprising:
a flow chamber, a first gear intermeshing with a second gear, the first gear and the second gear being positioned within the flow chamber, the intermeshing of the first gear and the second gear permitting synchronous rotation of the first gear and the second gear in response to the flow of fluid through the flow chamber, and a controller having a data storage;
while receiving the fluid at a known volumetric flow rate through the flow chamber:
generating, using the controller, pulses corresponding to rotation of the first gear and the second gear, the pulses having a pulse frequency associated therewith;
measuring fluid pressure of the fluid flowing through the flow chamber;
determining, using the controller, pulse frequency corresponding to the known volumetric flow rate of fluid;
generating, using the controller, correlations between pulse frequency, fluid pressure, and volumetric flow rates of fluids with different known viscosities flowing through the flow chamber; and
storing the generated correlations in the data storage;
receiving the fluid at the unknown volumetric flow rate:
measuring fluid pressure of the fluid flowing through the flow chamber;
determining, using the controller, pulse frequency corresponding to the unknown volumetric flow rate of the fluid;
determining, using the controller, the unknown volumetric flow rate based on the generated correlations;
determining, using the controller, the unknown viscosity based on the generated correlations.

19. The method of claim 18, further comprising, determining, using the controller, an unknown volumetric flow rate by measuring fluid pressure and determining the pulse frequency.

20. The method of claim 19, further comprising, retrieving from the data storage, a volumetric flow rate correlated with a measured value of fluid pressure and a determined value of pulse frequency.

21. The method of claim 18, further comprising, generating, using the controller, an indication signal when the viscosity of the fluid is determined to be outside a predefined range.

22. The method of claim 18, further comprising, generating pulses only when the first gear and the second gear rotate from a first valid rotational position to a second valid rotational position.

23. The method of claim 22, further comprising, generating pulses having a pulse duration less than a transition time, whereby the transition time corresponds to the time taken by the first gear and the second gear to rotate from the first valid rotational position to the second valid rotational position.

24. The method of claim 23, wherein, the controller determines the pulse frequency as the inverse of a time interval between adjacent pulses.

* * * * *